US007630339B2

(12) United States Patent
Laroia et al.

(10) Patent No.: US 7,630,339 B2
(45) Date of Patent: Dec. 8, 2009

(54) METHODS AND APPARATUS OF PROVIDING TRANSMIT DIVERSITY IN A MULTIPLE ACCESS WIRELESS COMMUNICATION SYSTEM

(75) Inventors: Rajiv Laroia, Basking Ridge, NJ (US); Junyi Li, Bedminster, NJ (US); Sundeep Rangan, Jersey City, NJ (US); Murari Srinivasan, Somerset, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 927 days.

(21) Appl. No.: 10/763,944

(22) Filed: Jan. 23, 2004

(65) Prior Publication Data

US 2005/0003768 A1    Jan. 6, 2005

Related U.S. Application Data

(60) Provisional application No. 60/509,741, filed on Oct. 8, 2003, provisional application No. 60/442,008, filed on Jan. 23, 2003.

(51) Int. Cl.
*H04Q 7/00* (2006.01)
(52) U.S. Cl. .................. 370/330; 370/343; 455/450
(58) Field of Classification Search .................. None
See application file for complete search history.

(56) References Cited

U.S. PATENT DOCUMENTS

| | | | |
|---|---|---|---|
| 5,752,193 | A | 5/1998 | Scholefield et al. |
| 6,694,147 | B1 | 2/2004 | Viswanath et al. |
| 6,836,661 | B2 | 12/2004 | Mohebbi |

(Continued)

FOREIGN PATENT DOCUMENTS

RU    2000108476    4/2002

(Continued)

OTHER PUBLICATIONS

PCT International Search Report dated Mar. 1, 2005 for International Application No. PCT/US04/01979, which was filed on Jan. 23, 2004.

(Continued)

*Primary Examiner*—Chi H. Pham
*Assistant Examiner*—Phuc Tran
(74) *Attorney, Agent, or Firm*—Kenneth K. Vu; Kenyon S. Jenckes

(57) ABSTRACT

Methods and apparatus for providing channel diversity to wireless terminals (WTs) in a manner that reduces the latency between the time a WT encounters satisfactory channel conditions are described. A plurality of communications channels with different physical characteristics are maintained in a cell by a base station (BS). Each WT monitors multiple channels and maintains multiple channel estimates at the same time so that rapid switching between channels is possible. Channel quality information is conveyed from each WT to the BS. The WT or BS selects a channel based on the measured channel quality. By supporting multiple channels and by introducing periodic variations into the channels in various embodiments, the time before a WT encounters a channel with good or acceptable channel conditions is minimized even if the WT does not change location. Multiple antennas are used at the BS to support numerous channels simultaneously, e.g., by controlling antenna patterns.

61 Claims, 18 Drawing Sheets

U.S. PATENT DOCUMENTS

| | | | |
|---|---|---|---|
| 6,892,059 B1 * | 5/2005 | Kim et al. | 455/272 |
| 7,042,856 B2 * | 5/2006 | Walton et al. | 370/329 |
| 2002/0105961 A1 * | 8/2002 | Hottinen et al. | 370/442 |
| 2003/0013451 A1 * | 1/2003 | Walton | 455/447 |
| 2003/0134451 A1 | 7/2003 | Chen | |
| 2003/0148738 A1 * | 8/2003 | Das et al. | 455/67.5 |
| 2004/0204098 A1 * | 10/2004 | Owen | 455/561 |

FOREIGN PATENT DOCUMENTS

| | | |
|---|---|---|
| WO | 9927741 | 6/1999 |
| WO | 9959263 | 11/1999 |
| WO | 0062456 | 10/2002 |

OTHER PUBLICATIONS

International Preliminary Report-PCT/U52004/001 979, International Search Authority- The International Bureau of WIPO-Geneva, Switzerland- Jul. 29, 2005.

Written Opinion-PCT/U52004/001 979, International Search Authority-US-Mar. 1, 2005.

* cited by examiner

METHODS AND APPARATUS OF PROVIDING TRANSMIT DIVERSITY IN A MULTIPLE ACCESS WIRELESS COMMUNICATION SYSTEM

RELATED APPLICATIONS

The present application claims the benefit of U.S. Provisional Patent Application Ser. No. 60/442,008, filed Jan. 23, 2003 titled "METHODS AND APPARATUS OF PROVIDING TRANSMIT DIVERSITY IN A MULTIPLE ACCESS WIRELESS COMMUNICATION SYSTEM" and U.S. Provisional Patent Application Ser. No. 60/509,741, filed Oct. 8, 2003 titled "METHODS AND APPARATUS OF PROVIDING TRANSMIT DIVERSITY IN A MULTIPLE ACCESS WIRELESS COMMUNICATION SYSTEM" each of which is hereby expressly incorporated by reference.

FIELD OF THE INVENTION

The present invention relates to communications systems and, more particularly, to methods and apparatus for providing transmit diversity in a multiple access cellular communications network.

BACKGROUND

In a wireless communication system, a base station, situated at a fixed location, communicates with a plurality of wireless terminals, e.g., mobile nodes that may move throughout its cell. A given base station, with a single fixed antenna may have a fixed antenna pattern. Consider a single base station; its antenna pattern will support variable levels of channel quality between the base station and mobile nodes, depending on the mobile node's location with respect to the antenna pattern. Now consider that an adjacent base station, with its own antenna pattern, may be creating different levels of interference at different locations. The channel quality between the base station and a mobile node will vary as the mobile node moves to different locations within the cell. The mobile node may experience fading resulting in a degradations or loss of communication. Certain areas within the cell may be considered dead zones where the channel quality is too poor to establish communications. Methods and apparatus are needed that reduce fading and dead zones within cells.

In a system, with many mobile nodes, there will typically be a large diversity among the population of users, e.g., for any given antenna pattern there will be some users with good channel condition, some users with poor channel conditions, and other users with varying levels of channel conditions. At any given instant of time each mobile node experiences quasi-static channel conditions. Pilot signals may be broadcast to the mobile nodes; each mobile node's channel quality may be measured and reported back to the base station. Therefore, a base station could schedule mobile nodes with good channel quality, and hold-off scheduling mobile nodes with poor channel quality. When such a method is used in a strict manner, a mobile node, with poor channel quality, might have to move to a location with acceptable channel quality in order to be scheduled by the base station.

In another approach, the base station could periodically readjust its antenna pattern, again send pilot signals, wait for channel quality reports from the mobile node and schedule those mobile nodes with good channel quality. This second approach may lead to a long delay for a mobile node situated in a location of poor channel quality before the base station antenna pattern is adjusted to an acceptable level. In addition, this second approach favors one set of mobile nodes at the expense of another set of mobile nodes. The scheduling delays involved with either of these approaches may be unacceptable for certain types of delay-sensitive traffic such as voice. In some cases, if the traffic of the user has stringent delay constraints, the base station may, be forced to schedule a user even when channel conditions are not favorable resulting in a poor quality of service. Thus, for real time applications such as voice, it is often important to minimize the time period between transmission to a wireless terminal.

In cases where a channel's conditions are varied, practical constraints limit the rate at which the conditions in a particular channel may be varied without negatively impacting communications system performance. From a wireless terminal's perspective, rapid changes in a communications channel are difficult to track. Furthermore, rapid changes often result in a channel estimate used to decode a received signal being inaccurate since the channel conditions may have changed significantly since the channel measurements upon which the channel estimate is based were made. The use of feedback loops between a base station and a wireless terminal for power control and other purposes limits the rate at which communications channels can be varied since varying channel conditions at a rate faster than the rate at which channel condition information is measured by a wireless terminal and fed back to the base station can lead to the base station having largely inaccurate channel condition information.

In view of the above discussion, is should be appreciated that there is a need for improved methods and apparatus for supporting communication to multiple wireless terminals in a cell which may be distributed throughout the cell. Improved methods for providing a mobile with suitable channel conditions for receiving information from a base station are needed. From a scheduling perspective, it would be beneficial if the time interval between periods where a wireless terminal in a cell encounters good channel conditions could be minimized so that the wireless terminal need not have a long delay before encountering suitable transmission conditions. If intentional channel variations are used, it is desirable that the rate at which variations are introduced into a channel be slower than the rate at which channel measurements are made by the wireless terminals and/or the rate at which channel condition information is feed back to the base station. It would be desirable if at least some new methods address the problem of the relative duration of a mobile node's quasi-static channel condition relative to an acceptable scheduling latency. Methods and apparatus that address ways to mitigate interference effects from adjacent cells would also be beneficial. Methods that exploit the user diversity of the system, rather than be constrained by it, would also be beneficial. Such improved methods could increase user satisfaction, increase quality of service, increase efficiency, and/or increase throughput.

SUMMARY

The present invention is directed to methods and apparatus for improving reducing scheduling latency in a communication system. In accordance with the present invention, multiple communications channels are maintained by a basestation with different physical characteristics and each of the communications channels occupies a portion of the available communications resource. The physical partition of the available communications resource into multiple parallel communication channels with different physical characteristics can be done in a variety of ways such as in frequency, in time, or in code, or some combination of these. In some embodiment, the communications channels are orthogonal to each other.

Each wireless terminal measures the channel conditions on different communications channels. A pilot signal is periodically transmitted in each of the communications channel to facilitate the measurement of the channel conditions. From the measured channel conditions, it is possible to determine which channel has the best channel conditions from the wireless terminal's perspective at a particular point in time. The wireless terminal provides channel condition information in messages to the base station. This information is used for power and rate control and/or transmission scheduling purposes. In some embodiments, each individual wireless terminal feeds back channel condition information and the base station selects, based on the channel condition information, which channel to use to transmit information to the wireless terminal. The base station will normally select the channel with the best conditions, e.g., highest SNR, from the plurality of channels for which a wireless terminal provides channel condition information. If that best channel is not available, the base station may select the next best channel. To reduce the amount of information required to be transmitted from a wireless terminal to the base station on a recurring basis, in some embodiments the wireless terminals select, based on channel condition measurements of multiple channels, which channel is to be used for transmitting information to the wireless terminal at a particular point in time. The wireless terminal communicates the channel selection as part of the channel feedback information supplied to the base station on a periodic basis. In such embodiments, the feedback information transmitted from a wireless terminal to the base station normally includes a channel identifier and channel quality information, e.g., a signal to noise ratio (SNR) or a signal to interference ratio (SIR).

The base station services many wireless terminals and, multiple wireless terminals may select the same channel to be used to transmit information during the same time period. In cases where a communications channel has been selected to be used by multiple wireless terminals, the base station takes into consideration the channel quality reported by the individual wireless terminals and gives a preference to the wireless terminals reporting higher channel quality than those reporting lower channel quality. Other quality of service and/or fairness criterion is also taken into account when the base station makes the scheduling decision in at least some embodiments. Scheduling latency is reduced as compared to systems using a single communications channel as a result of using multiple channels with differing physical characteristics which are reflected in the channel quality reported by the wireless terminals.

In various embodiments channels are implemented as a partition of an air link resource where each channel corresponds to a different portion of the air link resource in terms of time and/or frequency. To avoid requiring a wireless terminal to switch between multiple carrier frequencies, in some embodiments the carrier frequency used to transmit signals to a wireless terminal is the same on the plurality of different communications channels. In such an embodiment a wireless terminal can switch between channels without having to change the frequency used to mix a received signal from the passband to the baseband as part of a demodulation process. This has the advantage of allowing for rapid switching between communications channels which allows for switching to occur without interfering with ongoing Internet Protocol sessions even when the channel used to communication the voice or data packets is changed during an ongoing IP communications session.

To provide for the ability to switch between channels on a rapid basis, in some embodiments, wireless terminals maintain channel quality estimates and/or channel estimates for a plurality of different communications channels at the same time. In such embodiments at least two channel quality estimates and/or channel estimates are maintained at the same time. The two channel estimates are normally for the two best channels to the wireless terminal, as determined by the wireless terminal's measurements of the different channels. In some embodiment 3, 4 or more channel estimates are maintained. Each of the channel estimates is usually maintained independent of the other channel estimates so that the individual channel estimate will properly reflect the particular physical characteristics of the channel to which it corresponds. Channel estimates are normally based on multiple channel measurements which occur at different points in time.

In some embodiments multiple static communications channels are used. In at least one such embodiment at least 3 different channels are used. However the use of more channels with different physical characteristics, e.g., 4, 8 or even more in a cell is possible.

While use of multiple static channels with differing characteristics provides scheduling advantages over embodiments where a single channel is used, even greater benefits can be obtained by introducing variations into one or more of the different communications channels.

In some embodiments, beamforming methods of the type described in U.S. patent application Ser. No. 09/691,766 filed Oct. 18, 2000 which is hereby expressly incorporated by reference, are used on individual channels to deliberately induce channel variations. Multiple transmitter antennas are used in such an embodiment to facilitate introducing variations into the communication channel. This method results in channel variations that can be exploited by an opportunistic scheduler such as that used in the base station of the present invention.

By combining the opportunistic beamforming method, e.g., the introduction of intentional channel variations, with the use of multiple parallel communications channels, scheduling latency can be reduced beyond the latency reduction benefits that can be achieved using opportunistic beamforming alone. In fact, in some cases latency can be reduced by an amount directly related, if not proportional to, the number of different channels supported in the cell for communication information to the wireless terminals. The reduction in latency can be to a level that would not be possible using a single channel and beamforming since the rate at which beamforming can be used to change a channel in a productive manner is limited by the rate at which a wireless terminal measures the channel and provides channel quality information to a base station.

The use of parallel communications channels with multiple opportunistic beams creates an improved version of transmit antenna diversity which may be exploited using channel selection by the wireless terminal and/or base station based on channel quality measurements. Each of the parallel communications channels will normally exhibit a distinct wireless channel quality, thereby allowing the scheduler to take advantage of the diversity with a latency that will be a fraction of that possible when a single channel is used.

In accordance with the present invention, in the case where intentional variations are introduced into a communications channel, the rate at which the channel variations occur is usually slower than the rate at which the wireless terminals measure the quality of the particular channel which is being varied. In addition, the rate at which the wireless terminal provides channel feedback information, e.g., on a single channel, is usually faster than the rate at which channels are intentionally varied. In such embodiments the periodicity of the introduced channel variations is usually longer, e.g., in some cases at least twice as long, as the rate at which quality measurements of the particular channel are made and reported back to the base station. In such cases the relatively gradual change in the channel which is intentionally introduced should not have a significant impact on the accuracy of the channel estimate maintained by the wireless terminal or the channel condition information returned by a wireless terminal to a base station.

In order to reduce the possibility of repeated periods of interference affecting the same wireless terminal, the rate at which channel variations are introduced into channels of adjoining cells is controlled to be different. Thus, the base stations of adjoining cells, in some embodiments, introduce channel variations at different rates.

While the use of multiple transmission elements, e.g., multiple antennas, at a base station is not essential to the present invention, numerous embodiments of the present invention are implemented using multiple antennas. In some of these embodiments, control coefficient sets are maintained and used to control processing of signals transmitted from a base station using different antennas. In such embodiments, different antennas may be used for different communications channels. Alternatively, the same set of antennas can be shared by the different communications channels with signal processing being used to introduce amplitude and/or phase variations into the signals corresponding to the different parallel communications channels. The antenna pattern corresponding to a particular channel is varied in some embodiments to thereby vary the gain of the channel in a particular direction. The gain of multiple channels may be changed in unison to main a uniform difference between the channels to the extent possible.

The method and apparatus of the present invention may be used in a wide range of systems including frequency hopping, time division and/or code division based communications systems.

Numerous additional features and benefits are described in the detailed description which follows.

DETAILED DESCRIPTION

Figure 1:
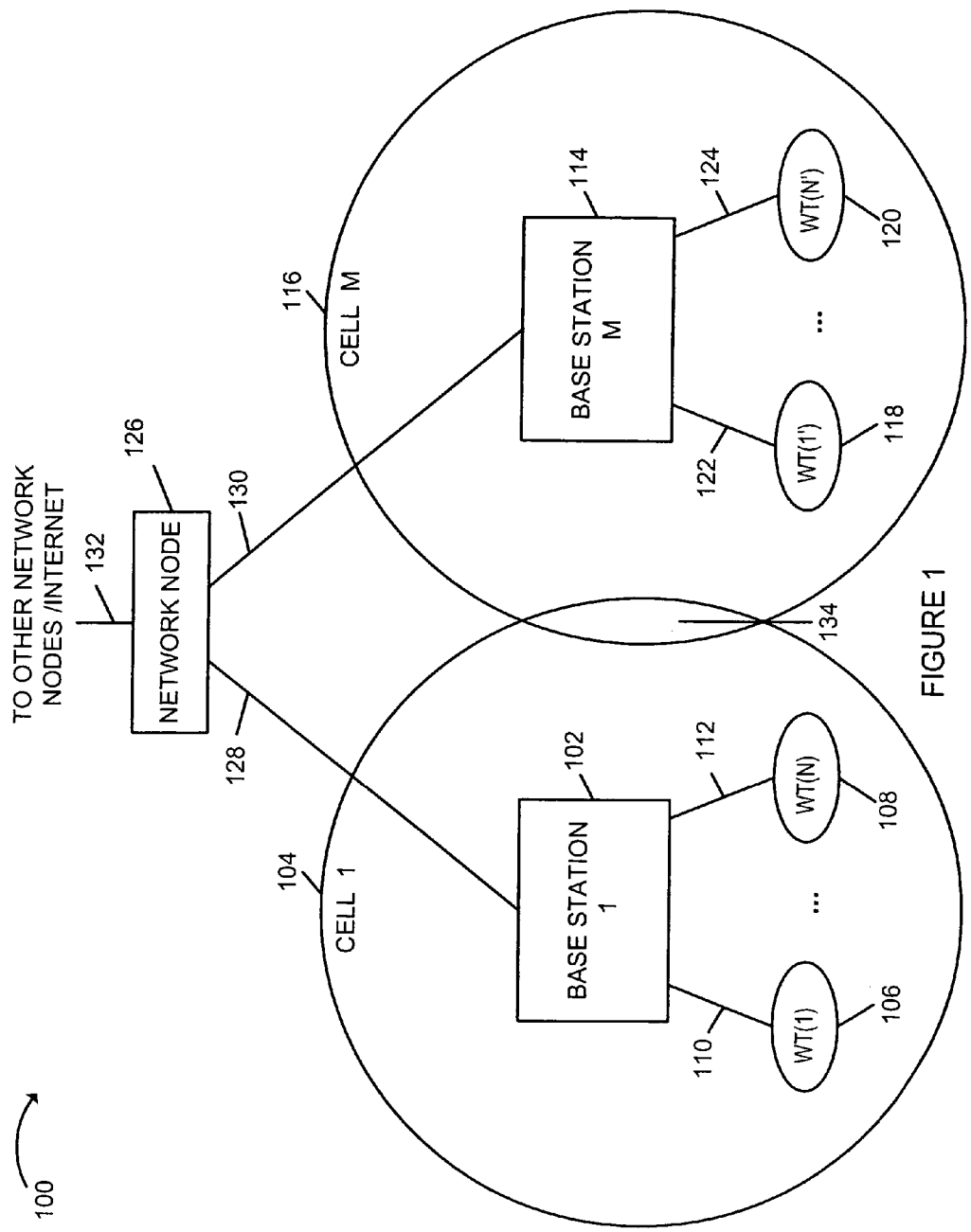
FIG. 1 illustrates an exemplary wireless communication system implemented in accordance with the invention.

FIG. 1 is an illustration of an exemplary wireless communications system 100, implemented in accordance with the present invention. Exemplary wireless communications system 100 includes a plurality of base stations (BSs): base station 1 102, base station M 114. Cell 1 104 is the wireless coverage area for base station 1 102. BS 1 102 communicates with a plurality of wireless terminals (WTs): WT(1) 106, WT(N) 108 located within cell 1 104. WT(1) 106, WT(N) 108 are coupled to BS 1 102 via wireless links 110, 112, respectively. Similarly, Cell M 116 is the wireless coverage area for base station M 114. BS M 114 communicates with a plurality of wireless terminals (WTs): WT(1') 118, WT(N') 120 located within cell M 116. WT(1') 118, WT(N') 120 are coupled to BS M 114 via wireless links 122, 124, respectively. WTs (106, 108, 118, 120) may be mobile and/or stationary wireless communication devices. Mobile WTs, sometimes referred to as mobile nodes (MNs), may move throughout the system 100 and may communicate with the base station corresponding to the cell in which they are located. Region 134 is a boundary region between cell 1 104 and cell M 116.

Network node 126 is coupled to BS 1 102 and BS M 114 via network links 128, 130, respectively. Network node 126 is also coupled to other network nodes/Internet via network link 132. Network links 128, 130, 132 may be, e.g., fiber optic links. Network node 126, e.g., a router node, provides connectivity for WTs, e.g., WT(1) 106 to other nodes, e.g., other base stations, AAA server nodes, Home agents nodes, communication peers, e.g., WT(N'), 120, etc., located outside its currently located cell, e.g., cell 1 104.

Figure 2:
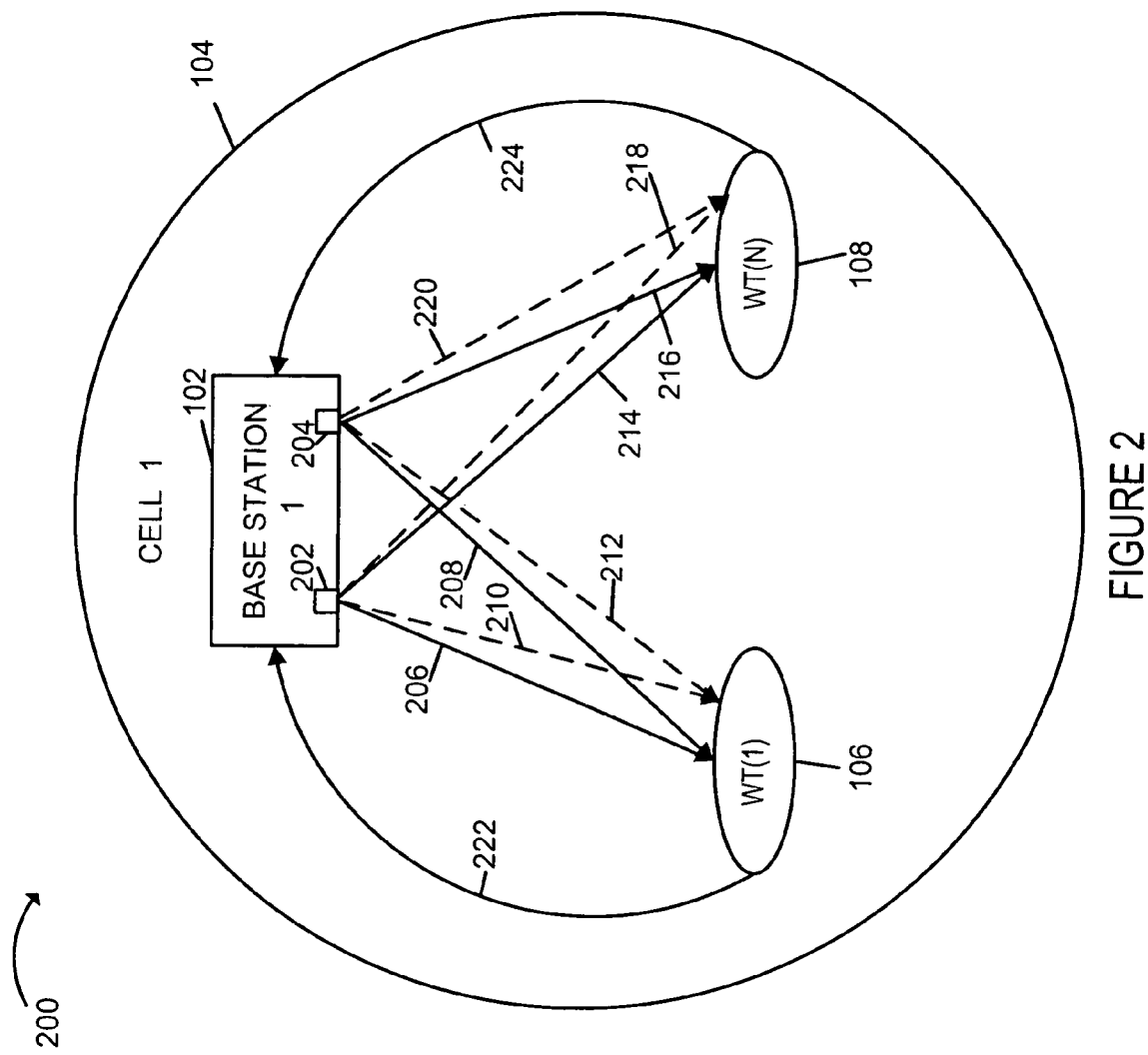
FIG. 2 illustrates an exemplary cell of the communication system of FIG. 1, exemplary communications channels, and exemplary signaling in accordance with the present invention.

FIG. 2 is a drawing 200 of cell 1 104 illustrating exemplary communications channels and exemplary signaling in accordance with the present invention. FIG. 2 includes communications within cell 1 104 between BS 1 102 and WTs (WT(1) 106, WT(N) 108). BS 1 102 includes multiple transmit antennas, e.g., transmitter antenna 1 202, transmitter antenna N 204. The base station 502 can transmit by multiple antennas 202, 204 to each WT 106, 108.

In the illustration of FIG. 2, the two solid lines (206, 208), one from each antenna (202, 204) to WT(1) 106, represent a first pipe to WT(1) 106. Similarly, the two dashed lines (210, 212), one from each antenna (202, 204) to WT(1) 106, represent a second pipe to WT(1) 106. Thus, solid lines (206, 208) correspond to one set of communications signals which combine in the air to operate as one downlink communications channel to WT(1) 106, while dashed lines (210, 212) represent signals which combine in the air and operate as a second downlink communications channel to WT(1) 106.

Similarly, the two solid lines (214, 216), one from each antenna (202, 204) to WT(N) 108, represent a first pipe to WT(N) 108; the two dashed lines (218, 220), one from each antenna (202, 204) to WT(N) 108, represent a second pipe to WT(N) 108. Thus, solid lines (214, 216) correspond to one set of communications signals which combine in the air to operate as one downlink communications channel to WT(N) 108, while dashed lines (218, 220) represent signals which combine in the air and operate as a second downlink communications channel to WT(N) 108. From the perspective of each WT 106, 108 they are coupled to BS 1 102 by two separate pipes from which information may be received at any given time. The wireless terminals (106, 108) provide feedback information to base station 1 102 as represented by arrows (222, 224) proceeding from each WT (106, 108), respectively, to base station 102. Feedback signals to the base station may include information on each of these pipes. Based on this feedback information, the BS 102 may determine which pipe to use and when to transmit data to the WT(1) 106 and/or WT(N) 108. In some embodiments, each WT (106, 108) sends a signal to the BS 102 indicating which of the pipes should be used at any point in time.

Figure 3:
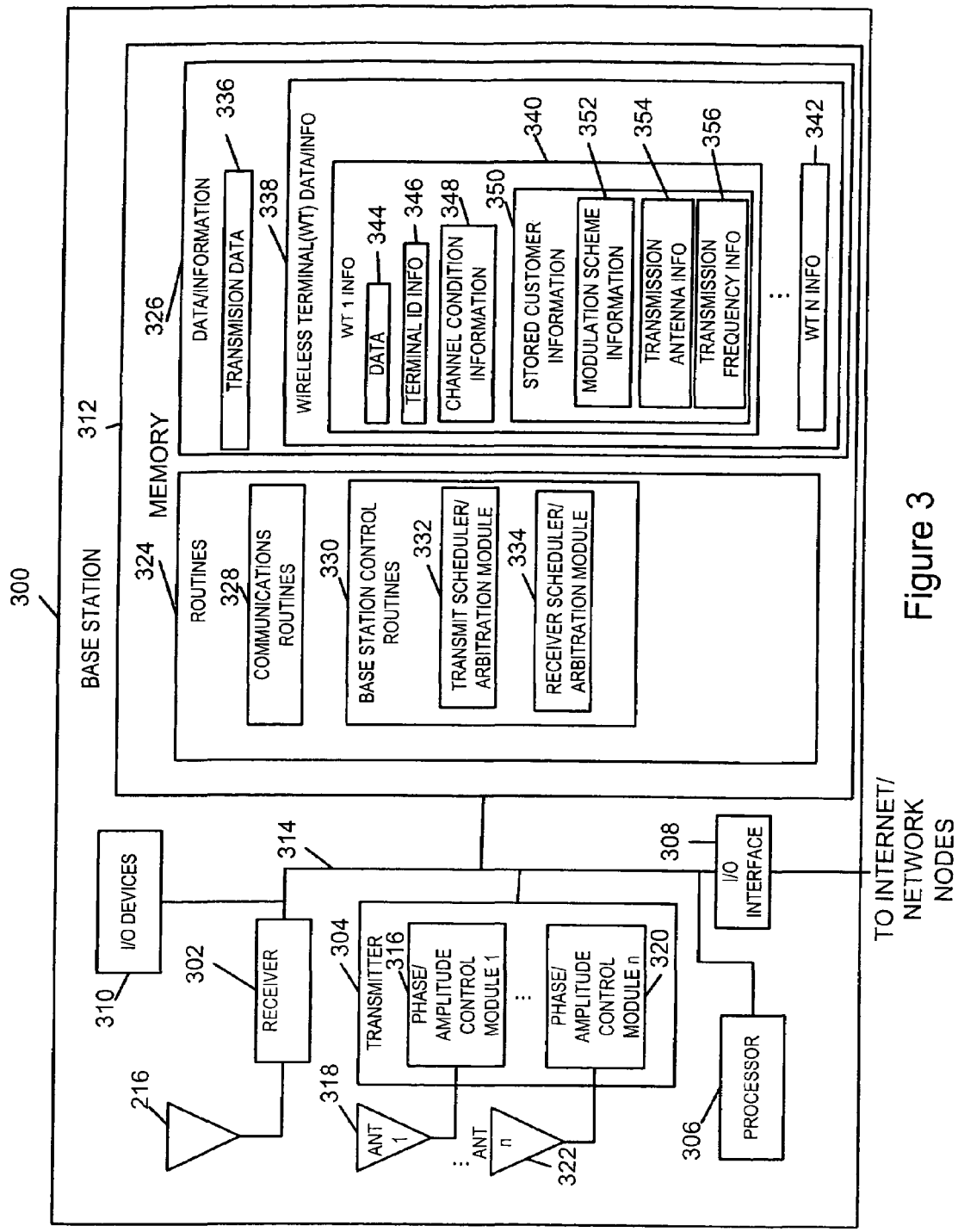
FIG. 3 illustrates an exemplary base station, suitable for use in the system of FIG. 1, implemented in accordance with the present invention.

FIG. 3 illustrates an exemplary base station 300, implemented in accordance with the present invention. Exemplary BS 300 may be a more detailed representation of any of the BSs, BS 1 102, BS M 114 of FIG. 1. BS 300 includes a receiver 302, a transmitter 304, a processor, e.g., CPU, 306, an I/O interface 308, I/O devices 310, and a memory 312 coupled together via a bus 314 over which the various elements may interchange data and information. In addition, the base station 300 includes a receiver antenna 216 which is coupled to the receiver 302. The base station 300, as shown in FIG. 3, also includes multiple transmitter antennas, (antenna 1 318, antenna n 322) which are physically spaced apart from each other. Transmitter antennas 318, 322 are used for transmitting information from BS 300 to WTs 400 (see FIG. 4) while receiver antenna 216 is used for receiving information, e.g., channel condition feedback information as well as data, from WTs 400.

The memory 312 includes routines 324 and data/information 326. The processor 306, executes the routines 324 and uses the data/information 326 stored in memory 312 to control the overall operation of the base station 300 and implement the methods of the present invention. I/O devices 310, e.g., displays, printers, keyboards, etc., display system information to a base station administrator and receive control and/or management input from the administrator. I/O interface 308 couples the base station 300 to a computer network, other network nodes, other base stations 300, and/or the Internet. Thus, via I/O interface 308 base stations 300 may exchange customer information and other data as well as synchronize the transmission of signals to WTs 400 if desired. In addition I/O interface 308 provides a high speed connection to the Internet allowing WT 400 users to receive and/or transmit information over the Internet via the base station 300. Receiver 302 processes signals received via receiver antenna 216 and extracts from the received signals the information content included therein. The extracted information, e.g., data and channel condition feedback information, is communicated to the processor 306 and stored in memory 312 via bus 314. Transmitter 304 transmits information, e.g., data, and pilot signals to WTs 400 via multiple antennas, e.g., antennas 318, 322. Transmitter 304 includes a plurality of phase/amplitude control modules, phase/amplitude control module 1 316, phase/amplitude control module n 320. In the illustrated example of FIG. 3, a separate phase/amplitude control module, (316, 320) is associated with each of the transmit antennas (318, 322), respectively. The antennas 318, 322 at the BS 300 are spaced far enough apart so that the signals from the antennas 318, 322 go through statistically independent paths, and thus the channels the signals go through are independent of each other. The distance between antennas 318, 322 is a function of the angle spread of the WTs 400, the frequency of transmission, scattering environment, etc. In general, half a wavelength separation between antennas, based on the transmission frequency, is usually the sufficient minimum separation distance between antennas, in accordance with the invention. Accordingly, in various embodiments, antennas 318, 322 are separated by one half a wavelength or more, where a wavelength is determined by the carrier frequency $f_k$ of the signal being transmitted.

The phase and amplitude control modules 316, 320 perform signal modulation and control the phase and/or amplitude of the signal to be transmitted under control of the processor 306. Phase/amplitude control modules 316, 320 introduce amplitude and/or phase variations into at least one of a plurality, e.g., two, signals being transmitted to a WT 400 to thereby create a variation, e.g., an amplitude variation over time, in the composite signal received by the WT 400 to which information is transmitted from multiple antennas 318, 322. The control modules 316, 320 are also capable of varying the data transmission rate, under control of the processor 306, as a function of channel conditions in accordance with the present invention. In some embodiments, phase/amplitude control modules 316, 320 change phase and/or amplitude by changing coefficients.

As mentioned above, the processor 306 controls the operation of the base station 300 under direction of routines 324 stored in memory 312. Routines 324 include communications routines 328, and base station control routines 330. The base station control routines 330 include a transmit scheduler/arbitration module 332 and a receiver scheduler/arbitration module 334. Data/Information 326 includes transmission data 336 and a plurality of wireless terminal (WT) data/information 338. WT data/information 338 includes WT 1 information 340 and WT N information 342. Each WT information set, e.g., WT 1 information 340 includes data 344, terminal ID information 346, channel condition information 348, and stored customer information 350. Stored customer information 350 includes modulation scheme information 352, transmission antenna information 354, and transmission frequency information 356. Transmission data 336 includes data, e.g., user data, intended to be transmitted to WTs 400, located within the cell of BS 300. Data 344 includes user data associated with WT 1, e.g., data received from WT 1 intended to be forwarded to a communication peer, e.g., WT N, and data receiver from a peer of WT 1, e.g., WT N, intended to be forwarded to WT 1. Terminal ID information 346 includes a current base station assigned identity for WT 1. Channel condition information 348 includes feedback information from WT 1 such as, e.g., downlink channel(s) estimation information and/or a WT 1 selected downlink channel.

The transmit scheduler/arbitration module 332 schedules when transmission data 336 will be transmitted, e.g., downloaded, to WTs 400. As part of the scheduling process module 332 arbitrates between the needs of various WTs 400 to receive data. The receiver scheduler/arbitration module 334 schedules when WTs 400 will be allowed to upload data to the BS 300. As with the transmit scheduler 332, the receiver scheduler 334 may arbitrate between several WTs 400 seeking to upload data at the same time. In accordance with the present invention, modules 332, 334 perform scheduling operations as a function of received channel condition feedback information, e.g., WT 1 channel condition information 348. Communications routines 328 determine the frequency and data rate as well as the appropriate encoding or modulation technique to be used for communications with each WT 400. Communications routine 328 can access the stored channel condition information and customer information, e.g., WT1 channel condition information 344 and WT 1 stored customer information 350 to obtain relevant information used by the routines 324. For example, communications routines 328 can access channel condition information 348 obtained from feedback to determine the appropriate data rate to be used in communicating to a WT 400. In addition, other stored customer information 350 such as modulation scheme information 352, transmission antenna information 354, and transmission frequency information 356 can be retrieved and used to determine the appropriate modulation scheme, number of transmission antennas, and transmission frequency to be used when communicating with a particular WT 400 scheduled to receive information.

While in some embodiments a single antenna is used to transmit information to a WT 400, the use of multiple physically separated antennas 318, 332 allows the same information to be transmitted from different locations with controlled phase and/or amplitude differences being introduced into at least one of the transmitted signals to produce an artificial signal variance at the receiving WT 400.

Figure 4:
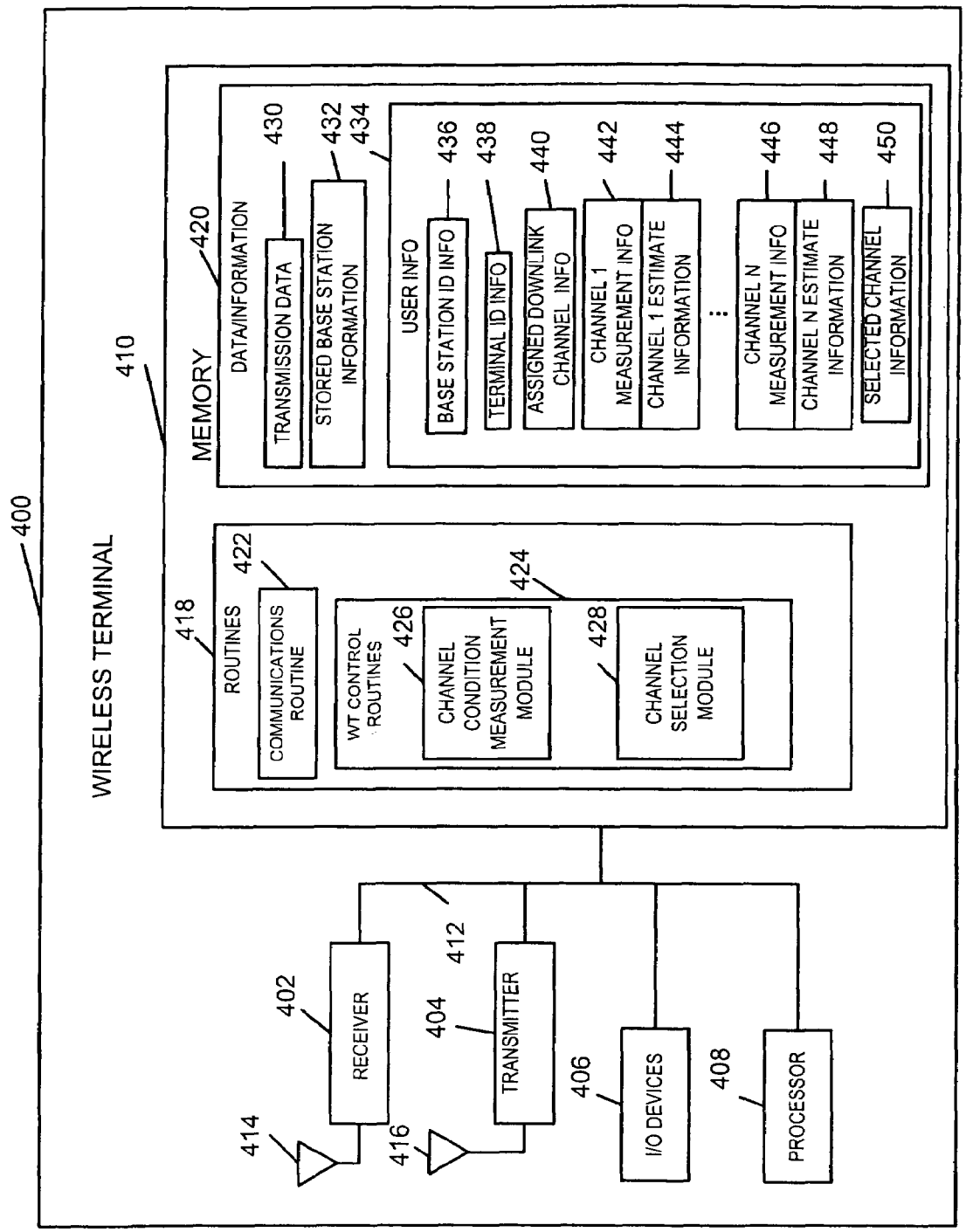
FIG. 4 illustrates an exemplary wireless terminal, suitable for use in the system of FIG. 1, implemented in accordance with the present invention.

FIG. 4 illustrates an exemplary wireless terminal 400, implemented in accordance with the present invention. Exemplary wireless terminal 400 may be a more detailed representation of any of the WTs 106, 108, 118, 120 of exemplary system wireless communication system 100 of FIG. 1. WT 400 includes a receiver 402, a transmitter 404, I/O devices 406, a processor, e.g., a CPU, 408, and a memory 410 coupled together via bus 412 over which the various elements may interchange data and information. Receiver 402 is coupled to antenna 414; transmitter 404 is coupled to antenna 416. In some embodiments, a single antenna may be used in place of the two individual antennas 414 and 416.

Downlink signals transmitted from BS 300 are received through antenna 414, and processed by receiver 402. Transmitter 404 transmits uplink signals through antenna 416 to BS 300. Uplink signals include downlink feedback channel estimation information and/or information identifying a selected downlink channel over which WT 400 requests that downlink data be transmitted, in accordance with the invention. I/O devices 406 include user interface devices such as, e.g., microphones, speakers, video cameras, video displays, keyboard, printers, data terminal displays, etc. I/O devices 406 may be used to interface with the operator of WT 400, e.g., to allow the operator to enter user data, voice, and/or video directed to a peer node and allow the operator to view user data, voice, and/or video communicated from a peer node, e.g., another WT 400.

Memory 410 includes routines 418 and data/information 420. Processor 408 executes the routines 418 and uses the data/information 420 in memory 410 to control the basic operation of the WT 400 and to implement the methods of the present invention. Routines 418 include communications routine 422 and WT control routines 424. WT control routines 424 include a channel condition measurement module 426 and a channel selection module 428.

Data/Information 420 includes transmission data 430, stored base station information 432, and user information 434. User information 434 includes base station identification information 436, terminal ID information 438, assigned downlink channel information 440, a plurality of channel measurement information (channel 1 measurement information 442, channel N measurement information 446), a plurality of channel estimate information (channel 1 estimate information 444, channel N estimate information 448), and selected channel information 450. Transmission data 430 includes user data, e.g., data/information to be transmitted to BS 300 intended for a peer node in a communication session with WT 400, downlink channel feedback information, and/or a selected downlink channel. Stored base station information 432 includes information specific to each base station, e.g., slope values that may be used in hopping sequences, carrier frequencies used by different base stations, modulation methods used by different base stations, beamforming variations that are base station dependent, etc. User information 432 includes information being currently used by WT 400. Base station ID information 436 includes identification information of the base station in whose cell WT 400 is currently located, e.g., a value of slope used in a hopping sequence. Terminal ID information 438 is a base station assigned ID used for current identification of WT 400 by the BS 300 in whose cell WT is located. Assigned downlink channel information 440 includes a downlink channel assigned by the BS 300 for the WT 400 to expect user data to be transmitted on. Channel 1 measurement information 442 includes measurements of received signals corresponding to channel 1, e.g., measurements of a pilot signal transmitted on downlink channel 1 such as SNR (Signal to Noise Ration), SIR (Signal Interference Ratio), etc. Channel N measurement information includes measurement of received signals corresponding to channel N, e.g., measurements of a pilot signal transmitted on downlink channel N such as SNR, SIR, etc. Channel 1 estimation information 444 includes downlink channel 1 estimates, e.g., based on channel 1 measurement information 442. Channel N estimation information 448 includes downlink channel 2 estimates based on channel N measurement information 446. Selected channel information 450 includes information identifying which channel WT 400 has identified as the more desirable downlink channel, e.g., which of the beamformed downlink channels 1, N is better suited at the present time for WT 400. Selected channel information 450 may also include channel measurement information corresponding to the selected channel.

The communications routine 422 controls the transmission and reception of data by transmitter 404 and receiver 402, respectively. Communications routine 422 may vary the data transmission rate, in accordance with the present invention based on channel conditions. In addition, communications routine 422 is responsive to scheduling information, received from BS 300 to insure that transmission data 430 is transmitted by the WT 400 at the times authorized by the BS 300. Communications routines 422 transmits channel condition information, e.g., channel measurement information 442, 446, selected channel information 450, and/or amplitude/phase feedback information to the BS 300 via transmitter 404. Communications routines 422 are also responsible for controlling the display and/or audio presentation of received information to a WT user via I/O devices 406.

Channel condition measurement module 426 measures channel conditions obtaining channel 1 measurement information 442, channel N measurement information 446. Channel condition measurement module 426 also processes the channel measurement information 442, 446 and obtains channel estimate information 444, 448, respectively. Channel condition measurement module 426 also supplies the amplitude and/or phase feedback information to the communications routine 422. Channel selection module 428 compares channel measurement information, e.g., channel 1 measurement information 442, channel N measurement information 446, selects which channel is better, stores the selection in selected channel information 450, and supplies the selected channel information 450 to the communications routine 422. Communications routine 422 then transmits channel measurement information 442, 446, selected channel information 450, and/or amplitude/phase information to the BS 300 via transmitter 404.

Figure 5:
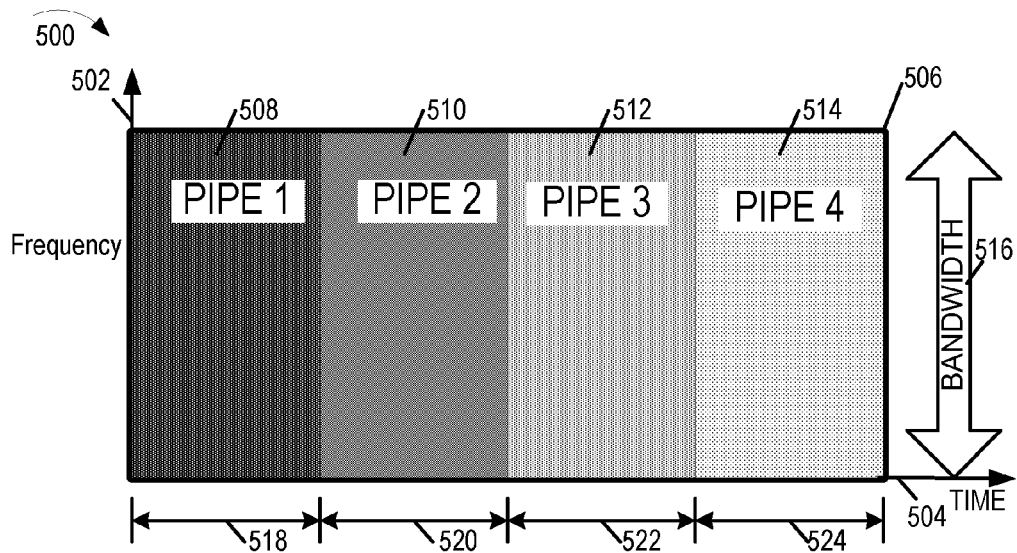
FIG. 5 illustrates the construction of exemplary parallel pipes, using a time partition method, between a base station and wireless terminals, in accordance with the invention.

FIG. 5 illustrates an exemplary embodiment of the construction of parallel pipes, e.g., downlink channels between BS 300 and WT 400. In the time partition method of FIG. 5, the time is divided into parallel pipes, each of which can be used simultaneously to transmit signals during a different time slot but using the same bandwidth. FIG. 5 is a graph 500 of frequency on the vertical axis 502 vs time on the horizontal axis 504. The air link resource represented by box 506 is partitioned in time into an exemplary four parallel pipes 508, 510, 512, 514. In the time partition method, each of the parallel pipes 508, 510, 512, 514 occupies the entire bandwidth 516 but within different time slots 518, 520, 522, 524.

Figure 6:
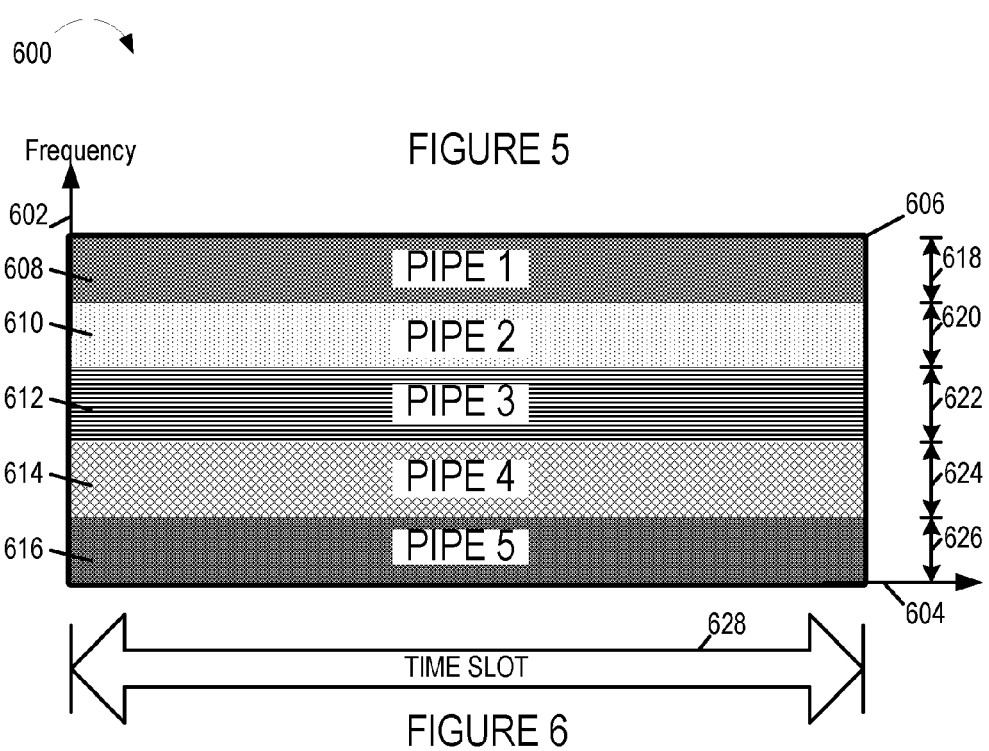
FIG. 6 illustrates the construction of exemplary parallel pipes, using a frequency partition method, between a base station and wireless terminals, in accordance with the invention.

FIG. 6 illustrates another exemplary embodiment of the construction of parallel pipes, e.g., downlink channels between BS 300 and WT 400. In the frequency partition method of FIG. 6, the bandwidth is divided into parallel pipes, each of which can be used simultaneously to transmit signals in parallel. FIG. 6 is a graph 600 of frequency on the vertical axis 602 vs time on the horizontal axis 604. The air link resource represented by box 606 is partitioned in frequency into an exemplary five parallel pipes 608, 610, 612, 614, 616. In the frequency partition method, each of the parallel pipes 608, 610, 612, 614, 616 occupies a different frequency range 618, 620, 622, 624, 626 but occupies the entire time slot 628.

Figure 7:
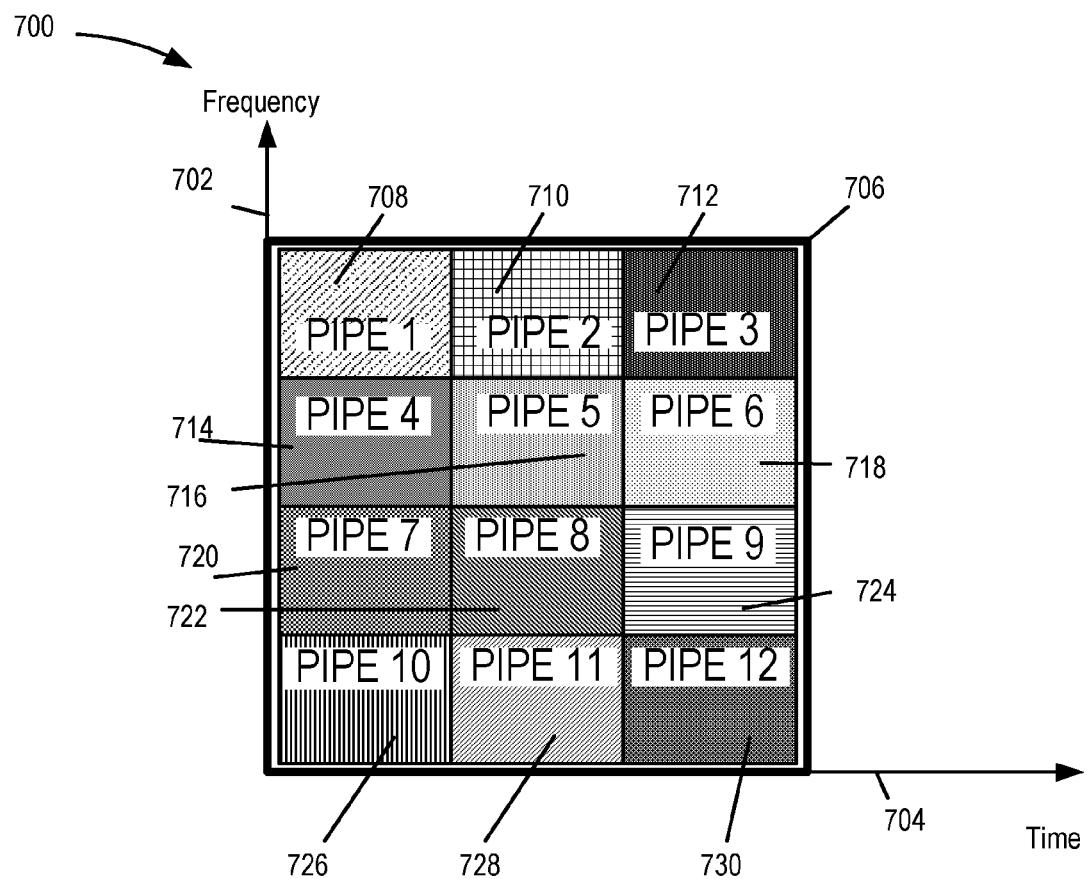
FIG. 7 illustrates the construction of exemplary parallel pipes, using a combination of frequency division/time division methods, between a base station and wireless terminals, in accordance with the present invention.

FIG. 7 illustrates another embodiment of the construction of parallel pipes, e.g., downlink channels between BS 300 and WT 400. The FIG. 7 embodiment combines the above embodiments of frequency division method (FIG. 6) and time division method (FIG. 5) to construct parallel pipes. FIG. 7 is a graph 700 of frequency on the vertical axis 702 vs time on the horizontal axis 704. The air link resource represented by box 706 is subdivided into 12 parallel pipes 708, 710, 712, 714, 716, 718, 720, 722, 724, 726, 728, 730.

Figure 8:
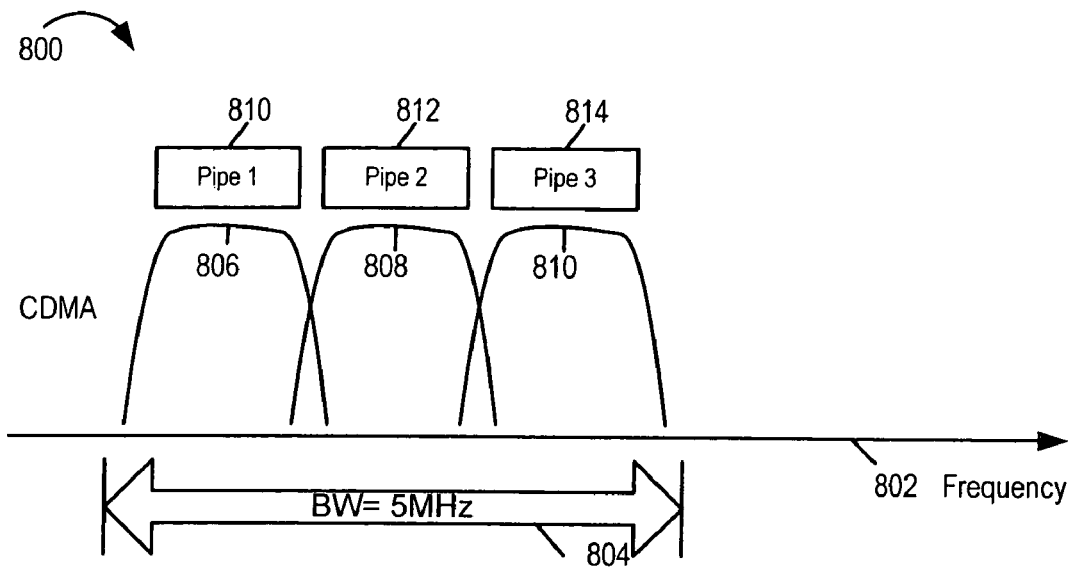
FIG. 8 illustrates exemplary parallel pipes using frequency division for exemplary 5 MHz CDMA/OFDM systems, in accordance with the present invention.
Figure 8:
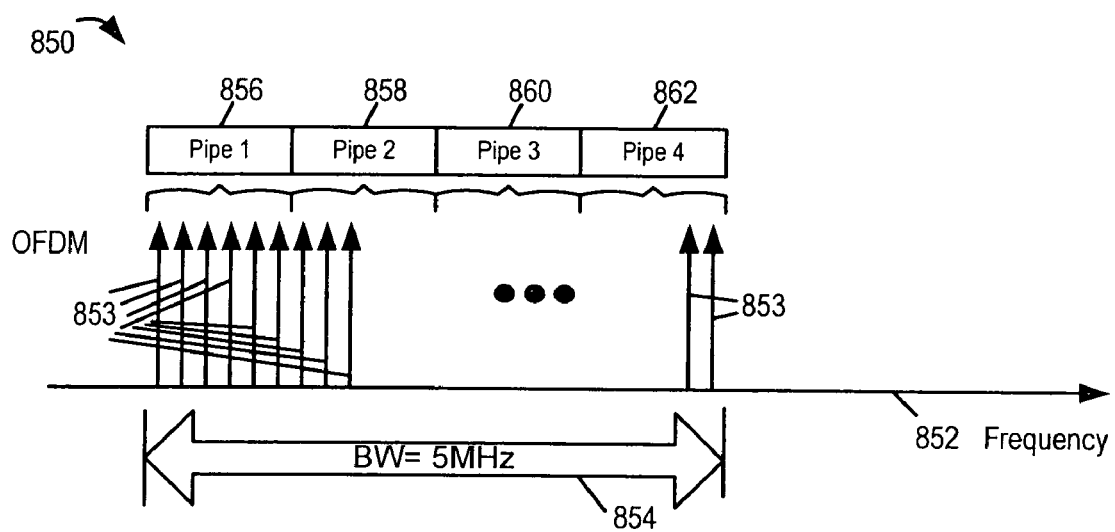
Figure 9:
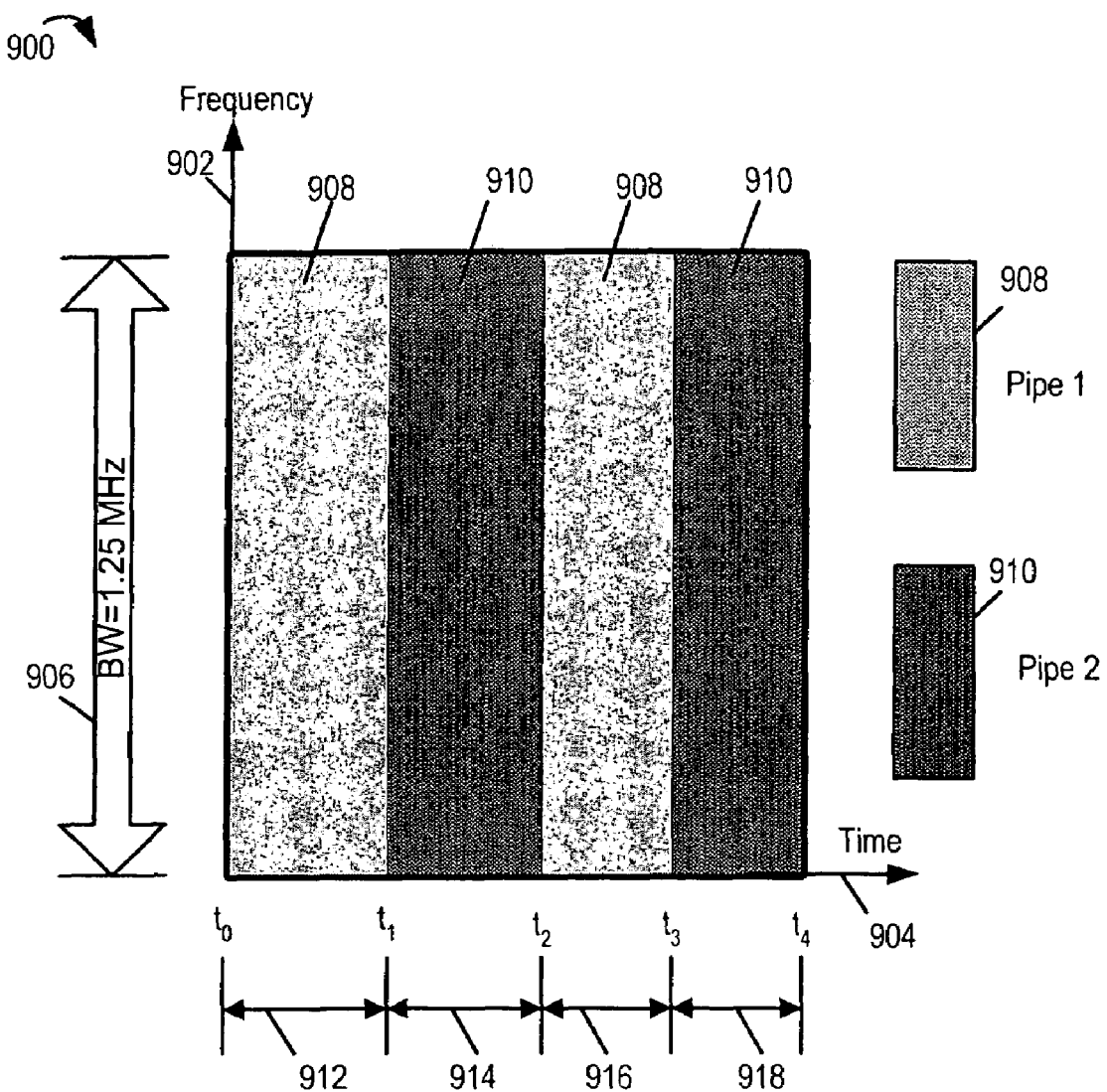
FIG. 9 illustrates exemplary parallel pipes in a 1.25 MHZ CDMA or OFDM system using time division, in accordance with the present invention.

FIG. 8 and FIG. 9 illustrate exemplary embodiments of using parallel pipes in exemplary CDMA and OFDM systems. FIG. 8 illustrates parallel pipes in exemplary systems using frequency division. In FIG. 8, drawing 850 shows frequency on the horizontal axis 802 corresponding to an exemplary CDMA system having a 5 MHz bandwidth 804 in total, which is partitioned into three carriers 806, 808, 810 each representing a 1.25 MHz pipe 810, 812, 814. Thus, there are three parallel pipes, pipe 1 810, pipe 2 812, and pipe 3 814 in that 5 MHz CDMA system. Drawing 850 shows frequency on the horizontal axis 852 corresponding to an exemplary OFDM system also having a 5 MHz bandwidth 854 in total, which is divided into N tones 853. In the figure, those N tones are grouped into four subsets, pipe 1 856, pipe 2 858, pipe 3 860, pipe 4 862. Thus, there are four parallel pipes 856, 858, 860, 862 in that 5 MHz OFDM system.

FIG. 9 is a graph 900 of frequency on the vertical axis 902 vs time on the horizontal axis 904. The exemplary illustrated CDMA or OFDM system represented by FIG. 9 has a 1.25 MHz bandwidth 906 in total, which is shared by two parallel pipes 908, 910 in a time division manner. In first time slot 912 ($t=t_0$ to $t=t_1$), pipe 1 908 is used; in second time slot 914 ($t=t_1$ to $t=t_2$) pipe 2 910 is used; in third time slot 916 ($t=t_2$ to $t=t_3$) pipe 1 908 is used; time slot 918 ($t=t_3$ to $t=t_4$) pipe 2 910 is used.

In various embodiments of the present invention, the bandwidth, number of pipes, number of carriers, number of tones, and/or number of subsets may vary. In various embodiments of the present invention, the partition allocation for each pipe may vary.

In accordance with the invention WT 400, under the control of channel condition measurement module 426, controls receiver 402 to measure received signals in order to obtain the channel quality of each of the parallel pipes. Channel (1,N) measurement information (442, 446) is obtained from the received signal. Separate channel measurements of multiple parallel pipes allows the WT 400 to perform pipe selection. The channel (1,N) measurement information (442, 446) may include signal-to-interference ratio (SIR) and fading characteristics. Each parallel pipe may have its own pilot(s) to facilitate the channel quality measurement, and the densities of pilots used may depend on the partitioning of the air link resource.

The WT 400 then reports the measurement results back to the transmission source, BS 300. In some embodiments, the reporting is frequent and/or periodic. In one embodiment, the channel quality report includes a list of the measurements of channel qualities in individual parallel pipes, e.g., channel (1,N) measurement information (442, 446). In another embodiment, the channel quality report includes the index of one of the parallel pipes that has the best channel quality and the corresponding channel quality measurement, e.g., selected channel information 450.

In accordance with the invention, for a wireless system, e.g., system 100 equipped with multiple transmitter antennas 318, 322 at the base station 300, the antennas 318, 322 are used to create different opportunistic beams for different parallel pipes. For the sake of description, consider the case of two antennas. The same principle can be easily extended to the case of many antennas. Let K denote the number of parallel pipes.

Denote the signal to be transmitted at time instant t over the K parallel pipes as $$\overline{s}(t) = \{S_1(t), S_2(t), \ldots, S_K(t)\}$$

(Note: In some locations vectors are notated by, lines above the symbol, in other locations vectors are denoted by underlining and/or boldface print. These conventions may be used interchangeably throughout this application.)

In an exemplary general description of the invention, two signals are derived from this basic signal and transmitted over the two transmit antennas respectively. The two derived signals may be described as $$\overline{S^{(1)}}(t) = \{c_1(t)S_1(t), c_2(t)S_2(t), \ldots, c_K(t)S_K(t)\}$$

$$\overline{S^{(1)}}(t) = \{d_1(t)S_1(t), d_2(t)S_2(t), \ldots, d_K(t)S_K(t)\}$$

where $c_k(t)$ and $d_k(t)$ are, in general, complex time-varying coefficients superposed on the signal on the k-th parallel pipes over the first and second transmit antenna, respectively. In accordance with the invention, coefficients $\{c_1(t), c_2(t), \ldots, c_K(t)\}$ and $\{d_1(t), d_2(t), \ldots, d_K(t)\}$ are independent of the transmitted signal $\overline{S}(t)$.

Figure 10:
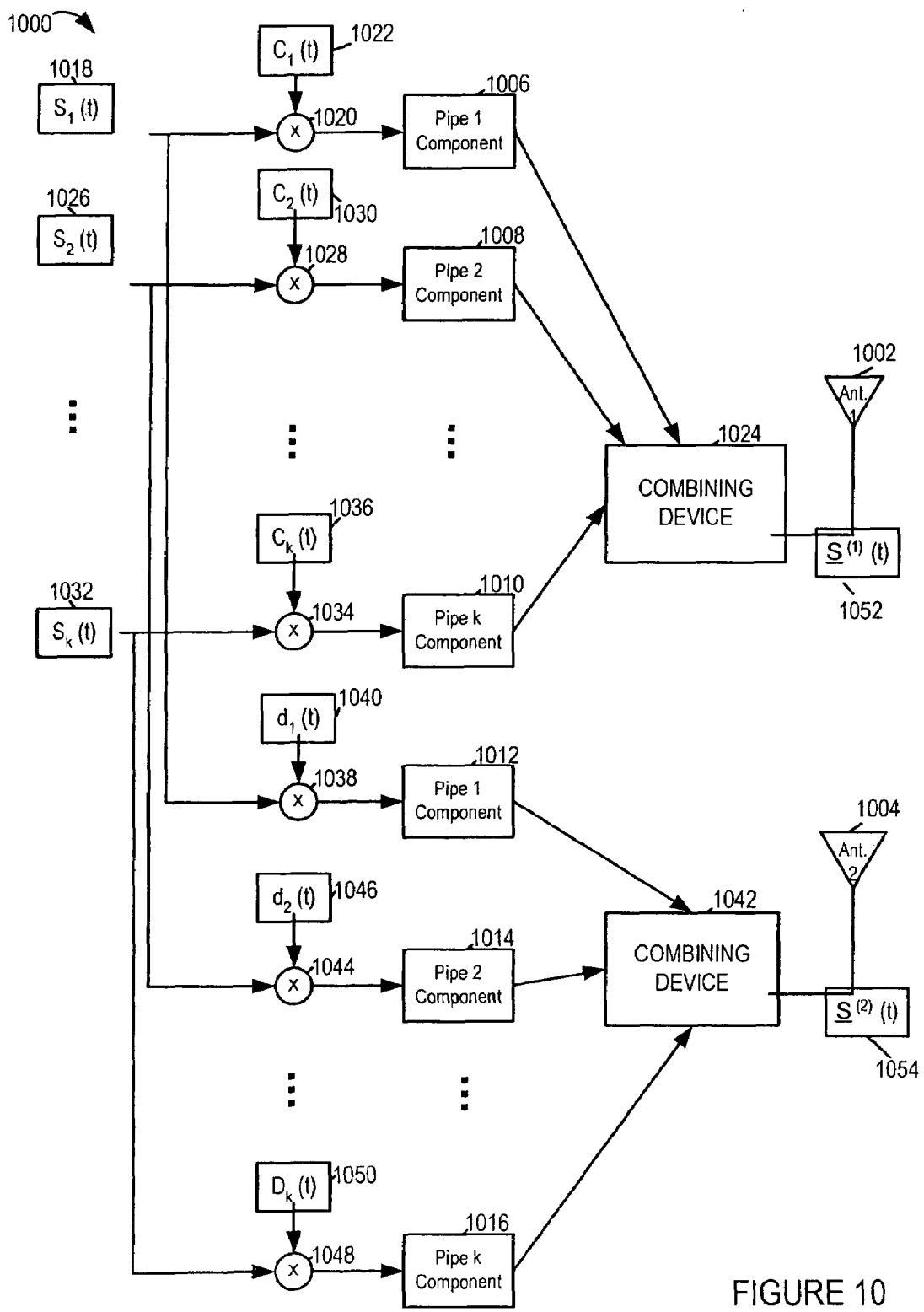
FIG. 10 is a diagram of an exemplary transmitter using parallel pipes and multiple antennas, in accordance with the present invention.

FIG. 10 illustrates a diagram 1000 of an exemplary embodiment of the invention using multiple transmit antennas (1002, 1004) transmitting over parallel pipes. FIG. 10 shows k parallel pipes and two antennas. Pipe 1 component 1006, pipe 2 component 1008, . . . , and pipe k 1010 correspond to antenna 1 1002. Pipe 1 component 1012, pipe 2 component 1014, . . . , and pipe k 1016 correspond to antenna 2 1004.

Input signal $S_1(t)$ 1018 is multiplied, via multiplier 1020 by complex time-varying coefficient $c_1(t)$ 1022 generating pipe 1 component 1006; pipe 1 component 1006 is input to combining device 1024. Input signal $S_2(t)$ 1026 is multiplied, via multiplier 1028 by complex time-varying coefficient $c_2(t)$ 1030 generating pipe 2 component 1008 ; pipe 2 component 1008 is input to combining device 1024. Input signal $S_K(t)$ 1032 is multiplied, via multiplier 1034 by complex time-varying coefficient $c_k(t)$ 1034 generating pipe k component 1010 ; pipe k component 1010 is input to combining device 1024. Input signal $S_1(t)$ 1018 is multiplied, via multiplier 1038 by complex time-varying coefficient $d_1(t)$ 1040 generating pipe 1 component 1012 ; pipe 1 component 1012 is input to combining device 1042. Input signal $S_2(t)$ 1026 is multiplied, via multiplier 1044 by complex time-varying coefficient $d_2(t)$ 1046 generating pipe 2 component 1014 ; pipe 2 component 1014 is input to combining device 1042. Input signal $S_K(t)$ 1032 is multiplied, via multiplier 1048 by complex time-varying coefficient $d_k(t)$ 1050 generating pipe k component 1016 ; pipe k component 1016 is input to combining device 1042.

The circuitry illustrated in FIG. 10 may be, e.g., part of transmitter 304 in base station 300. In the FIG. 10 example a combining device (1024, 1042) is used to combine signals from various pipes for transmission using an antenna. Each of the illustrated combing devices takes signals being transmitted over parallel 'pipes' and processes them to generate a signal to be transmitted over a single physical antenna. Combining device 1024 takes pipe 1 component 1006, pipe 2 component 1008, . . . pipe k component 1010 and combines them into signal $S^1(t)$ 1052 which is transmitted over antenna 1 1002. Combining device 1042 takes pipe 1 component 1012, pipe 2 component 1014, . . . pipe k component 1016 and combines them into signal $S^2(t)$ 1054 which is transmitted over antenna 2 1004. In the event of pipes created in the time domain, the combining devices 1024, 1042 may be implemented as multiplexers. For frequency-domain pipes, the combining devices 1024, 1042 may be implemented as 'summers' since it is combines signals that belong to different frequency bands.

The invention results in transmit diversity gains being realized in the receiver 402 of WT 400. Denote the channel responses from the two antennas to the receiver as $h_c(t)$ and $h_d(t)$ respectively. For the sake of description, it is assumed that the channel response from any antenna 318, 322 (in BS 300) to the receiver 402 (in WT 400) is constant across frequency. However, this assumption does not diminish or constrain the invention in any way. Therefore, the signal received by the receiver 402 (in WT 400) is given by $$\overline{R}(t) = \{[c_1(t)h_c(t) + d_1(t)h_d(t)]S_1(t), \ldots, [c_K(t)h_c(t) + d_K(t)h_d(t)]S_K(t)\},$$

where the k-th element in vector $\overline{R}(t)$ is the received signal over the k-th parallel pipe. Hence, when the invention is applied to the system with two transmit antennas and multiple parallel pipes, the composite channel response in k-th parallel pipe from the transmitter to the receiver is effectively given by $c_k(t)h_c(t) + d_k(t)h_d(t)$. With a suitable choice of the values of the coefficients $\{c_k(t)\}$ and $\{d_k(t)\}$ at the transmitter 304 (in BS 300), at least one pipe should have decent composite channel quality with high probability, although the composite channel responses of other pipes may be of bad quality. In any event, the latency experienced by a receiver 402 (in WT 400) in waiting for a time instant when it experiences high channel quality is drastically reduced since it can select between opportune scheduling instants on multiple pipes.

The idea of the opportunistic beamforming paradigm is that the transmitter 304 (in BS 300) chooses proper values of the coefficients, the receiver 402 (in WT 400) independently measures the channel qualities of the parallel pipes. WT 400 reports to the BS 300 (with transmitter 304) the measurement results, and the BS 300 controls the transmitter 304 to send traffic to the receiver 402 with those pipes that have good channel quality. To use the invention, the receiver 402 does not need to estimate $h_c(t)$ and $h_d(t)$ explicitly.

Figure 11:
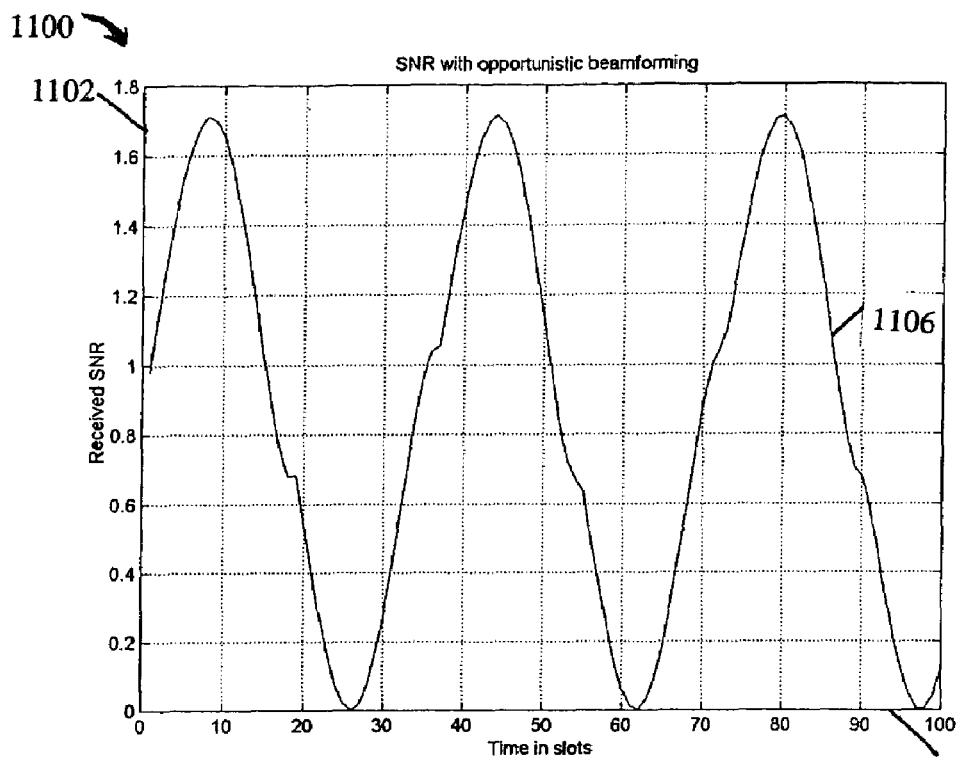
FIG. 11 is a graph illustrating opportunistic beamforming for a single beam, in accordance with the present invention.
Figure 12:
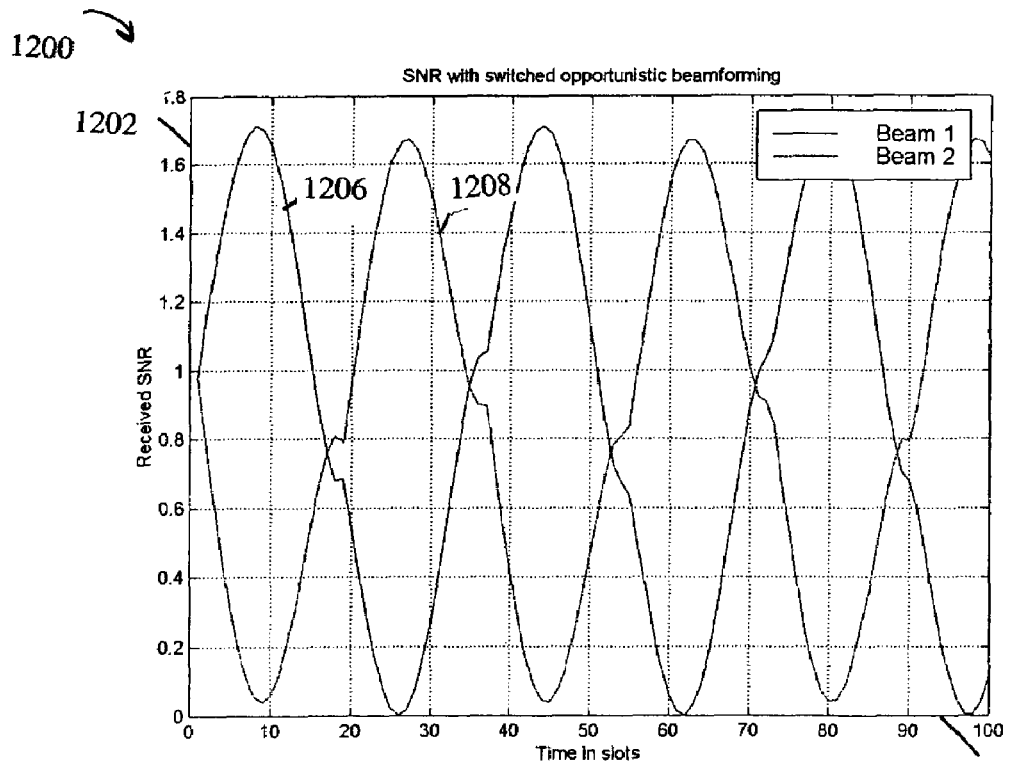
FIG. 12 is a graph illustrating opportunistic beamforming for two exemplary beams in accordance with the present invention.

In one of the embodiments of this invention, each of the parallel pipes has its own opportunistic beam. FIG. 11 is a graph 1100 illustrating opportunistic beamforming for a single beam. FIG. 11 plots received SNR on the vertical axis 1102 vs time in slots on the horizontal axis 1104; the characteristic of the single opportunistic beam 1106 corresponding to a single parallel pipe is shown. FIG. 12, is a graph 1200 illustrating opportunistic beamforming for two exemplary beams. FIG. 12 plots received SNR on the vertical axis 1202 vs time in slots on the horizontal axis 1204; the characteristic of the opportunistic beam 1 1206 corresponds to a first parallel pipe, while the characteristic of opportunistic beam 2 1208 corresponds to a second parallel pipe. The complex time-varying weights are adjusted so that the beams are effectively offset from one another. The receiver 402 sees the channel quality varying over time on any particular pipe. In general, the receiver 402 perceives high channel quality on one of the pipes (and corresponding beams) when another pipe (and corresponding beam) offer low channel quality, as illustrated in FIG. 12. It is easy to see that using two beams effectively reduces the latency at the receiver 402 in waiting for a time instant when the channel quality is high and the receiver 402 can select between the beams depending on their channel qualities. The receiver 402 is in a position to select the strongest among these rotating beams and report the pipe associated with the selected beam (and the corresponding channel quality) to the transmitter 304), such that the transmitter 304 can send traffic to the receiver 402 with the pipe of the best channel quality.

In the present invention, with multiple rotating beams being transmitted on parallel pipes, the receiver 402 can see diverse channel quality in a short time period and therefore the latency in getting good channel quality is significantly reduced.

The choice of the coefficients $\{c_k(t), d_k(t)\}$ is quite flexible. In one embodiment, $\{c_k(t)\}$ is set to a constant, $\{d_k(t)\}$ is set to be a constant-amplitude complex number with phase being rotating with time, and the phase components of $\{d_k(t)\}$ are uniformly with time:

$$c_k(t)=1$$

$$d_k(t)=\exp(j2\pi ft+v_k)$$

where the phase offsets $\{v_k\}$ are uniformly distributed in $[0, 2\pi]$. For example, for K=3, $$v_1 = 0, v_2 = \frac{2\pi}{3},$$

$$v_3 = \frac{4\pi}{3},$$

and for K=4, $v_1=0$, $$v_2 = \frac{\pi}{2},$$

$v_3=\pi$, $$v_4 = \frac{3\pi}{2}.$$

This particular embodiment results in multiple opportunistic beams that each rotates with frequency f.

As a special case of the embodiment, f can be zero, that is, the opportunistic beams do not rotate. In this case, the coefficients can be chosen in either a random manner, or with the phases uniformly distributed, and can be held constant over at least some time period. This special case is especially attractive when a large number of parallel pipes (K>2) are realized. Given the large number of parallel pipes, it is highly likely that at any given time, the receiver 402 can find at least one pipe that is 'highly beamformed'.

As a generalization to the embodiment, the coefficients can use different and time-varying amplitudes:

$$c_k(t)=\sqrt{\alpha_k(t)}$$

$$d_k(t)=\sqrt{1-\alpha_k(t)}\exp(j2\pi ft+v_k)$$

where $\{\alpha_k(t)\}$ are real numbers.

In general, the number of pipes formed need not be the same as the number of opportunistic beams realized using multiple antennas. Multiple beams (up to the number of transmit antennas) can be realized within the same pipe, with the receivers tracking the signal quality on each of these beams on each of these pipes. In fact, different users can then be scheduled on the different beams within a pipe. For example, in the case of two beams within a pipe, one user may have a null on the first beam and be scheduled on the second beam. Another user may be in a complementary situation, having a null on the second beam and will therefore be scheduled on the first beam.

When the pipes are formed by splitting the bandwidth and the total system bandwidth is larger than a coherence bandwidth, the method of beam selection described here can exploit the diversity gains from both the transmit antenna diversity and frequency diversity available in the system without requiring any scheduling latency.

In a cellular environment, the channel quality is determined not only by the signal component but also by the interference component. To optimize the channel quality, multiple transmit antennas and parallel pipes can be used such that the receiver 402 is highly beamformed in its desired cell, e.g., cell 1 104 (opportunistic beamforming) and at the same time highly nulled in its adjacent cells, e.g., cell M 116 (opportunistic nulling). In one embodiment of the invention, each cell can independently apply the invention illustrated in the above description except that the frequency of rotation of beams f used in adjacent cells may be different.

Figure 13:
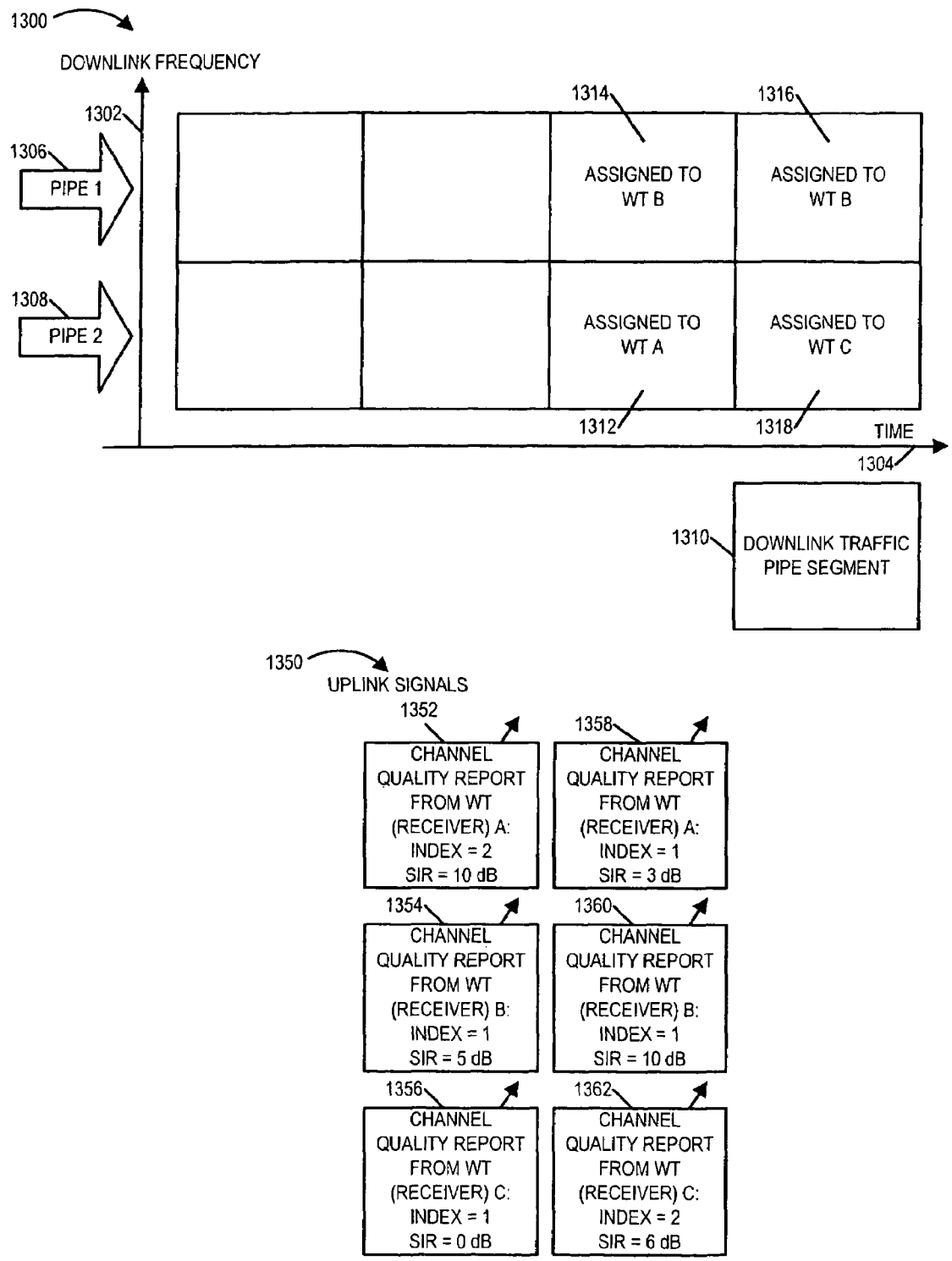
FIG. 13 illustrates the use of two exemplary downlink parallel pipes (constructed by frequency division) and uplink signaling including channel quality reports (including pipe selection by WTs), in accordance with the present invention.

FIG. 13 illustrates the use of two parallel pipes, indexed as 1 and 2, constructed by frequency division in a frequency division multiplexed system, e.g., an OFDM system. Graph 1300 illustrates downlink frequency on the vertical axis 1302 vs time on the horizontal axis 1304. The downlink frequency is subdivided into pipe 1 1306 and pipe 2 1308. Each box 1310 in graph 1300 represents a downlink traffic pipe segment. FIG. 1350 illustrates uplink signaling, e.g., downlink channel quality reports, from three exemplary WTs 400 (WT A, WT B, WT C) to BS 300, in accordance with the invention.

WTs 400 (A, B, C) including their respective receivers 402 (A, B, C), measure and estimate the channel quality of each of the parallel pipes using the pilots transmitted by BS 300 in downlink signaling in those pipes. The WTs 400 (A, B, C) then report back the best channel quality value and the associated parallel pipe index, in their respective channel quality reports 1352, 1354, 1356. In this example, the opportunistic beamforming is such that the channel quality (SIR) measured by receiver A for the two pipes are 0 dB and 10 dB, the SIR measured by receiver B for the two pipes are 5 dB and −3 dB, and the SIR measured by receiver C for the two pipes are 0 dB and −2 dB. Therefore, WT A reports that the pipe of index 2 has the best channel quality and the SIR is 10 dB, WT B reports that the pipe of index 1 has the best channel quality and the SIR is 5 dB, and WT C reports that the pipe of index 1 has the best channel quality and the SIR is 0 dB. Then, the BS 300, including transmitter 304, decides to transmit a segment of traffic 1312 to WT A using the pipe 2, and in parallel, to transmit another segment of traffic 1314 to receiver B using the pipe 1. The BS 300 further determines the coding/modulation rate and transmission power to be used in those two segments on the basis of the SIR reports from WTs A and B. A short time later, WTs 400 (A, B and C) send their channel quality reports 1358, 1360, 1362, respectively, again. This time, WT A reports that the pipe of index 1 has the best channel quality and the SIR is 3 dB, WT B reports that the pipe of index 1 has the best channel quality and the SIR is 10 dB, and WT C reports that the pipe of index 2 has the best channel quality and the SIR is 6 dB. Then, the base station 300 decides to transmit a segment of traffic 1316 to WT B using the pipe 1, and in parallel, to transmit another segment of traffic 1318 to WT C using the pipe 2.

Pipes discussed in the present invention represent channels which can be used to communicate information. Different pipes, e.g., different channels, will have intentionally induced channel variations. These per channel variations can be measured by a wireless terminal 400. The induced channel variations will be reflected in channel feedback reports. In various embodiments, the rate at which measurable channel variations are introduced is the same as or slower than the channel report feedback rate. In this manner, the BS 300 should have accurate channel information which may not be the case if the period of channel variations is shorter than the feedback report period.

Figure 14:
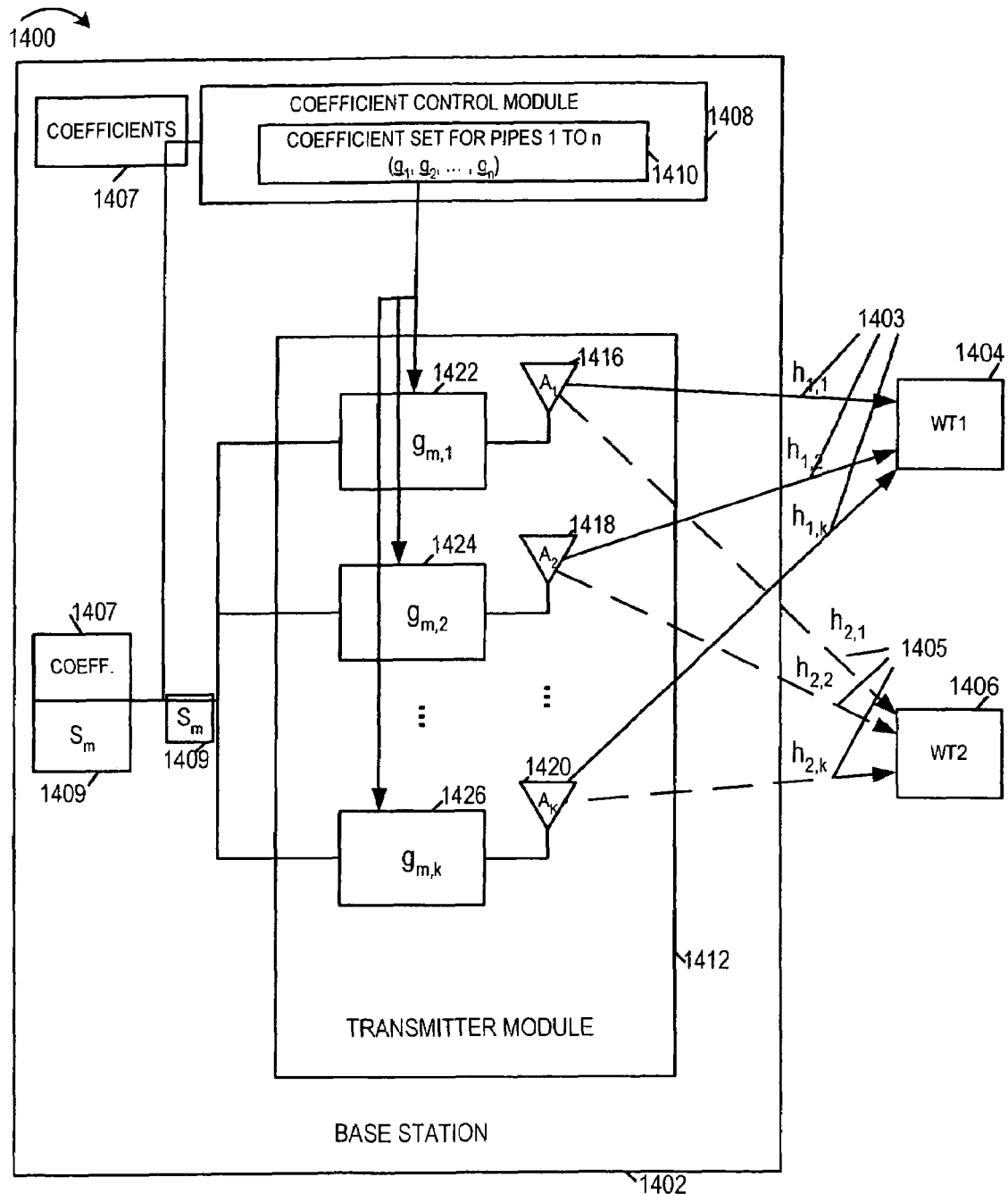
FIG. 14 illustrates a portion of an exemplary wireless communications system showing an embodiment of the invention suited for applications where channels are constructed using time division multiplexing.
Figure 15:
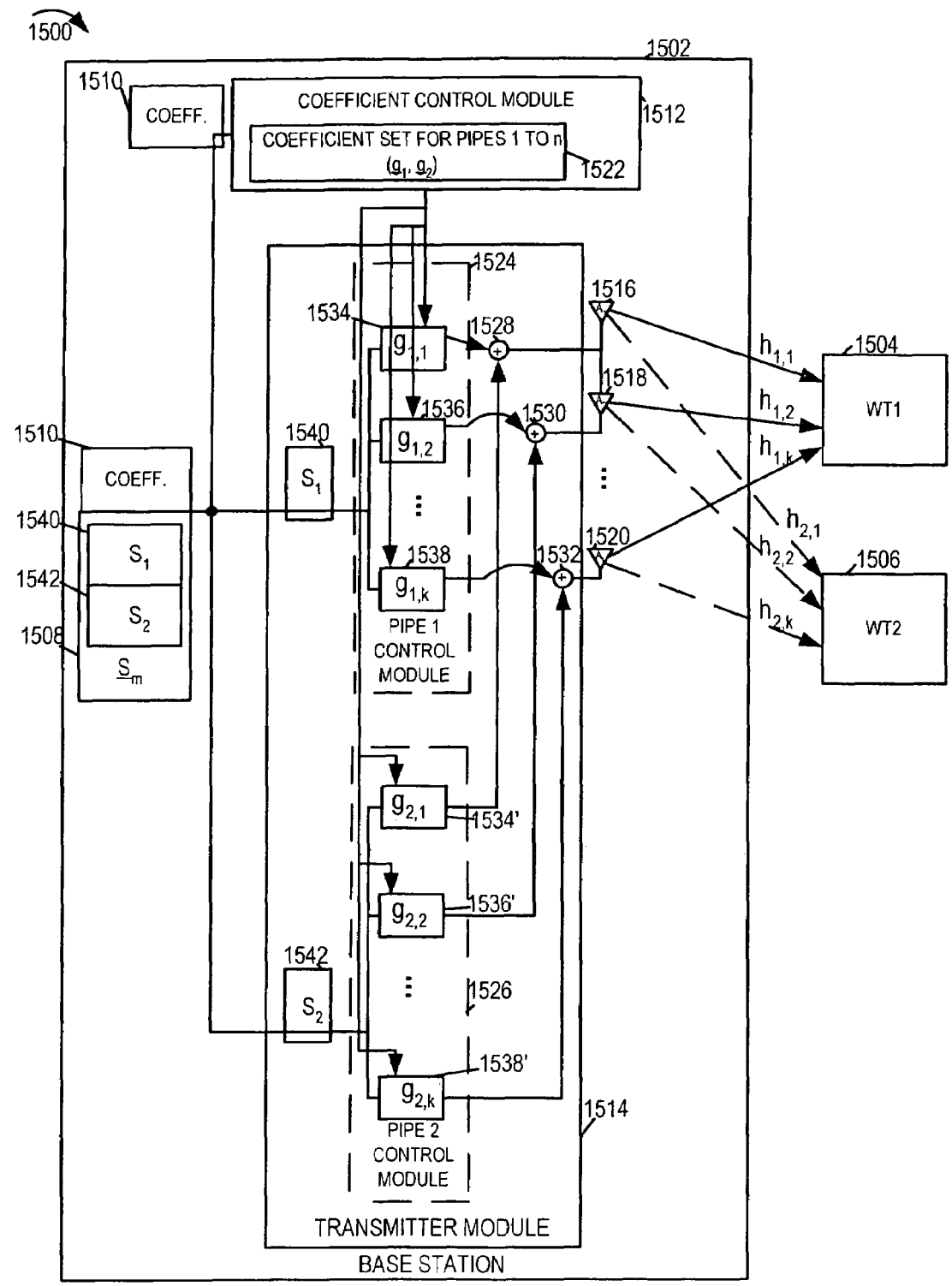
FIG. 15 illustrates a portion of an exemplary wireless communications system showing an embodiment of the invention suited for applications where channels are constructed using frequency division multiplexing.

Various features and embodiments of the present invention will now be discussed further. FIGS. 14 and 15 show exemplary base stations which can be used to implement the methods discussed below. FIG. 14 shows a portion of an exemplary communications system 1400 including an exemplary base station (BS) 1402 and two exemplary wireless terminals, WT1 1404 and WT2 1406. BS 1402 includes an exemplary input signal $S_m$ 1409, coefficients 1407, a coefficient control module 1408, a transmitter module 1412, an a plurality of antennas ($A_1$ 1416, $A_2$ 1418, ..., $A_k$ 1420). The coefficient control module 1408 includes coefficient sets 1410 for a plurality of pipes (e.g., for pipes 1 to n). The transmitter module 1412 includes k processing elements (1422, 1424, ..., 1426) corresponding to the k antennas (1416, 1418, ..., 1420), respectively. The coefficient set for exemplary pipe m is shown where $g_m = [g_{m,1}, g_{m,2}, \ldots g_{m,k}]^T$. In base station 1402, different sets of transmission coefficients 1410 are used to generate different pipes, e.g., at alternating times. (See FIG. 16.) For example at the time when it is desired to transmit over pipe 1, $S_m = S_1$ and $g_m = g_1 = [g_{1,1}, g_{1,2}, \ldots, g_{1,k}]^T$; at the time when it is desired to transmit over pipe 2, $S_m = S_2$ and $g_m = g_2 = [g_{2,1}, g_{2,2}, \ldots, g_{2,k}]^T$. One exemplary pipe 1403 is shown from BS 1402 to WT1 1404; a second exemplary pipe 1405 is shown from BS 1402 to WT2 1406. The coefficients control processing elements (1422, 1424, 1426), may be, e.g., gain and/or phase adjusting circuits. The FIG. 14 embodiment is well suited for cases where different channels are constructed using time divisional multiplexing, e.g., CDMA applications.

FIG. 15 shows a portion of an exemplary communications system 1500 including an exemplary base station (BS) 1502 and two exemplary wireless terminals, WT1 1504 and WT2 1506. BS 1502 includes an input signal $\underline{S}_m$ 1508, coefficients 1510, a coefficient control module 1512 a transmitter module 1514 an a plurality of antennas, (e.g., k antennas, $A_1$ 1516, $A_2$ 1518, ..., $A_k$ 1520). The coefficient control module 1512 includes coefficient sets 1522 for a plurality of pipes (e.g., for pipes 1 to n). FIG. 15 illustrates an exemplary two pipe embodiment; other numbers of pipes are possible in accordance with the invention. The transmitter module 1514 includes a pipe control module for each pipe, e.g., pipe 1 control module 1524, pipe 2 control module 1526. Transmitter module 1514 also includes k summing elements (1528, 1530, ..., 1532) corresponding to the k antennas (1516, 1518, ..., 1520), respectively. Each pipe control module (1524, 1526) includes k processing elements ((1534, 1536, ..., 1538 for pipe 1), (1534', 1536', ..., 1538' for pipe 2)) corresponding to the k antennas (1516, 1518, ..., 1520), respectively. The coefficient set for pipe 1 is $g_1 = [g_{1,1}, g_{1,2}, g_{1,k}]^T$. The coefficient set for pipe 2 is $g_2 = [g_{2,1}, g_{2,2}, g_{2,k}]^T$ Input signal $\underline{S}_m$ 1508 includes a $S_1$ component 1540 and an $S_2$ component 1521. $S_1$ input signal component 1540 is the input signal to pipe 1 control module 1524; $S_2$ input signal component 1542 is the input signal to pipe 2 control module 1526.

BS 1502, as shown in FIG. 15, is suitable for transmitting using multiple pipes in parallel where the different pipes may correspond to different sets of tones, e.g., frequencies. The FIG. 15 example is particularly well suited for the case where the channels are constructed using frequency division multiplexing, e.g., OFDM applications.

Figure 16:
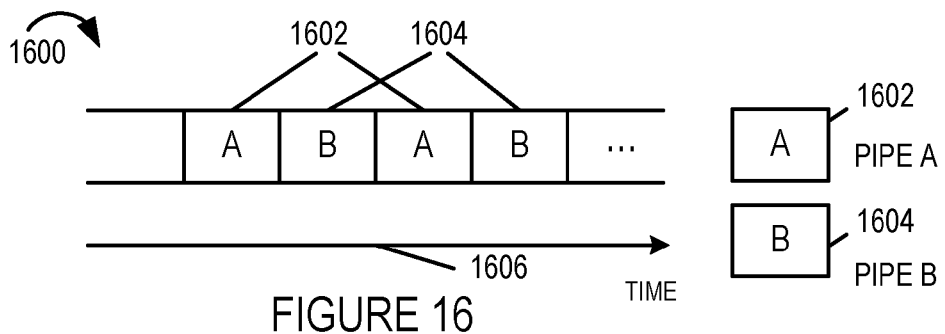
FIG. 16 is a drawing illustrating alternate pipes in alternate time slots, in accordance with the invention.

FIG. 16 is a drawing 1600 illustrating alternate pipes A and B (1602, 1604) generated by using alternating sets of transmission control coefficients, e.g., using the transmitter shown in FIG. 14 and changes in coefficient sets over time 1606. The difference between channel characteristics, e.g., gain, normally differs between channels A and B in any two adjacent slots more than the change in gain introduced in a channel between consecutive time slots used by a particular channel. For example, a large difference is maintained between channels A and B at any given time, while the individual channel A varies slowly over time and individual channel B varies slowly over time.

Figure 17:
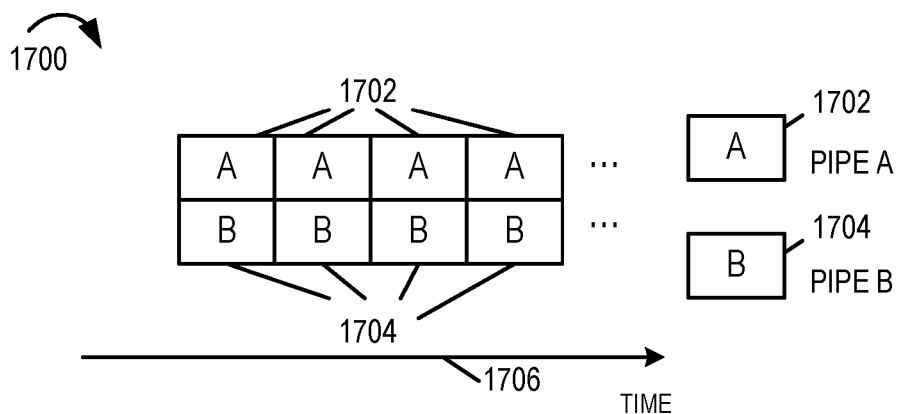
FIG. 17 is a drawing illustrating parallel pipes during the same time slots, in accordance with the invention.

FIG. 17 is a drawing 1700 illustrating parallel pipes A and B (1702, 1704) over time 1706. Parallel pipes A and B (1702, 1704) are generated using first and second sets of coefficients, e.g., using the transmitter shown in FIG. 15. Changes in coefficient sets are made over time to induce channel variations. Differences between channel characteristics, e.g., gain, normally differ between channels A and B in any two parallel channels more than the change in gain introduced in a channel between consecutive time slots used by the particular channel. For example, a large difference is maintained between channels A and B at any given time, while individual channel A is varied slowly over time and individual channel B is varied slowly over time.

Figure 18:
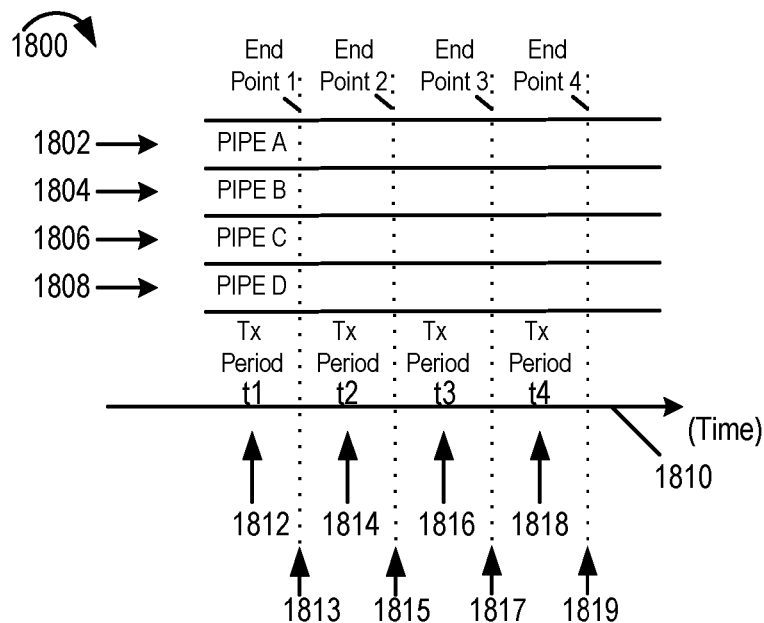
FIG. 18 is a drawing illustrating four parallel pipes with different transmission characteristics which are varied over time.

FIG. 18 is a drawing 1800 illustrating four parallel pipes (pipe A 1802, pipe B 1804, pipe C 1806, pipe D 1808) with different transmission characteristics which are varied over time, e.g., which are changed by modifying transmission control coefficients at the end of each transmission time period ($t_i$). Four transmission periods $t_1$ 1812, $t_2$ 1814, $t_3$ 1816, and $t_4$ 1818 and their corresponding end points 1813, 1815, 1817, and 1819, respectively, are shown.

FIGS. 19, 20, 21 and 22 show changes in antenna patterns over time in accordance with the present invention as induced by using different transmission control coefficients over time for the different pipes, e.g., parallel or alternating channels. While shown as a single fixed antenna pattern during each illustrated time period it is to be understood that the pattern could be changed gradually during the time period resulting in the pattern changing from that shown in one figure to that shown in the next figure by the conclusion of the particular time period.

Figure 19:
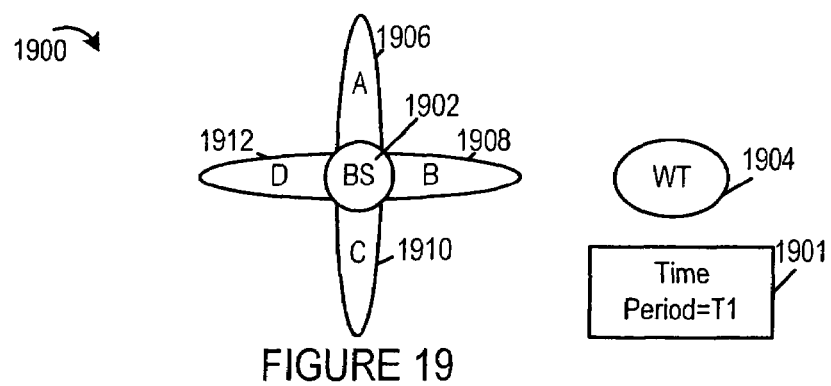
FIGS. 19-22 show changes in antenna patterns over time, in accordance with the present invention.

FIG. 19 illustrates an exemplary base station 1902 and an exemplary WT 1904, implemented in accordance with the present invention. In FIG. 19 a combined antenna pattern is shown including antenna patterns 1906, 1908, 1910, 1912 corresponding to channels A, B, C, D, respectively. Note each lobe 1906, 1908, 1910, 1912 corresponds to the directional pattern of one channel during illustrated time period T1 1901.

Figure 20:
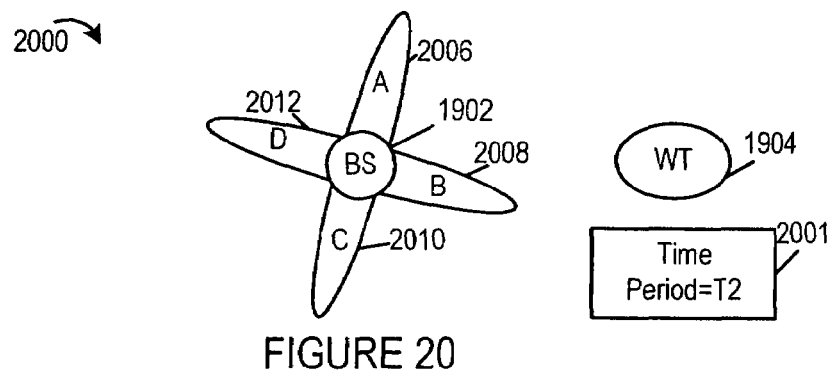

FIG. 20 illustrates the exemplary base station 1902 and the exemplary WT 1904. In FIG. 20 a combined antenna pattern is shown including antenna patterns 2006, 2008, 2010, 2012 corresponding to channels A, B, C, D, respectively. Note each lobe 2006, 2008, 2010, 2012 corresponds to the directional pattern of one channel during illustrated time period T2 2001.

Figure 21:
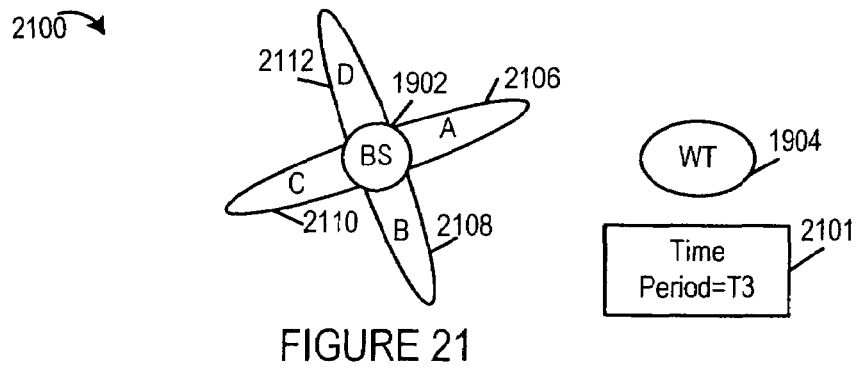

FIG. 21 illustrates the exemplary base station 1902 and the exemplary WT 1904. In FIG. 21 a combined antenna pattern is shown including antenna patterns 2106, 2108, 2110, 2112 corresponding to channels A, B, C, D, respectively. Note each lobe 2106, 2108, 2110, 2112 corresponds to the directional pattern of one channel during illustrated time period T3 2101.

Figure 22:
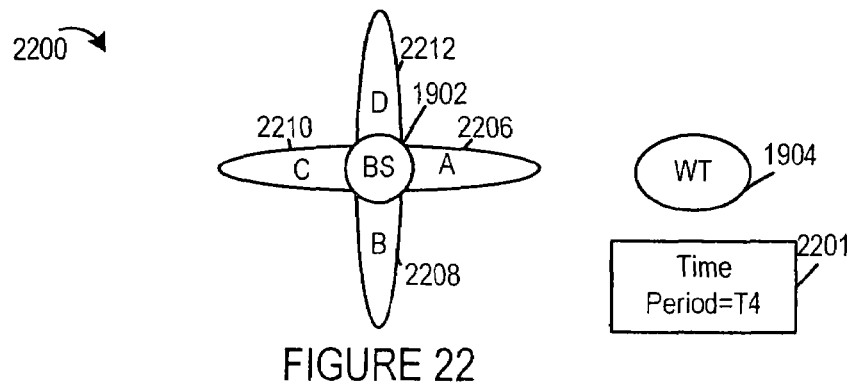

FIG. 22 illustrates the exemplary base station 1902 and the exemplary WT 1904. In FIG. 22 a combined antenna pattern is shown including antenna patterns 2206, 2208, 2210, 2212 corresponding to channels A, B, C, D, respectively. Note each lobe 2206, 2208, 2210, 2212 corresponds to the directional pattern of one channel during illustrated time period T4 2201.

Note that the difference between the patterns is designed to minimize the time before a wireless terminal 1904, e.g., mobile, located anywhere in the 360 degree transmission field will have to wait before encountering a channel with an optimal or near optimal transmission pattern which, as can be appreciated, will produce good channel transmission characteristics from the wireless terminal's, e.g., mobile nodes, perspective. As discussed previously, the BS 1902, in accordance with the invention, includes a transmit scheduler/arbitration module, (See, e.g., module 332 of FIG. 3) and uses channel feedback information to schedule transmissions to individual wireless terminals.

Figure 23A:
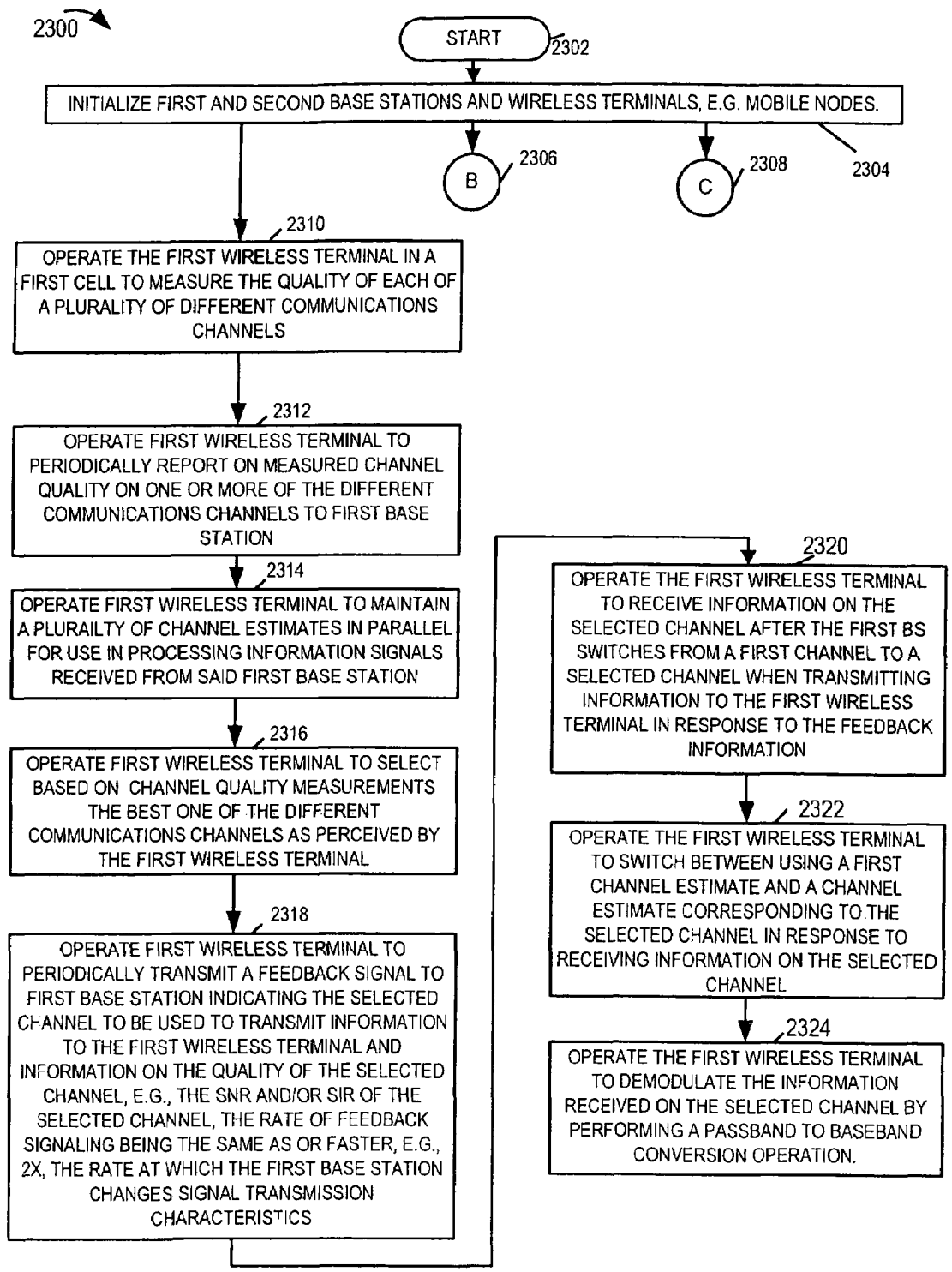
FIG. 23, which comprises the combination of FIGS. 23A, 23B, 23C, is a flowchart illustrating an exemplary method of operating a wireless communications system in accordance with the present invention.
Figure 23B:
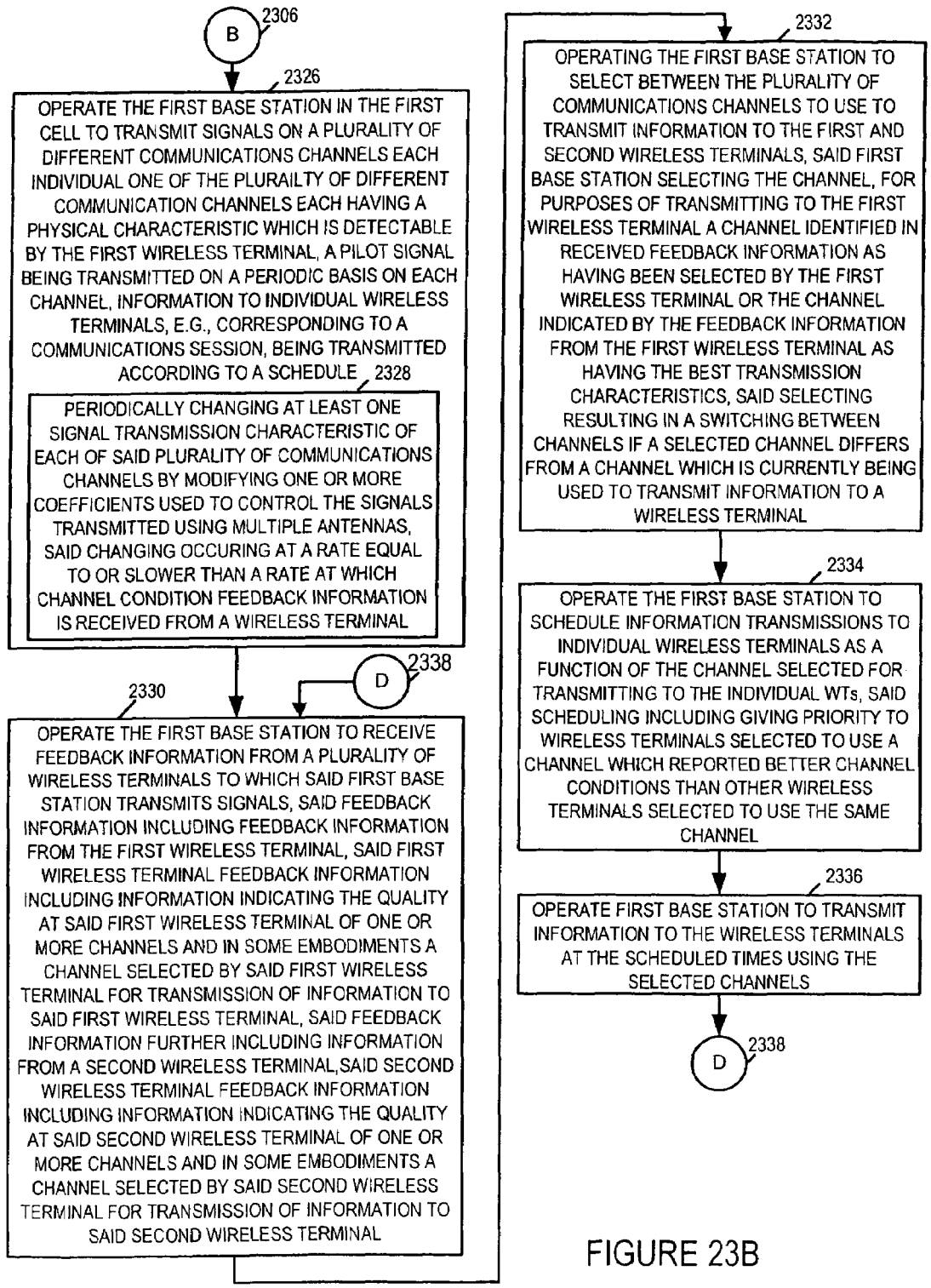
Figures 23, 23A, 23B, 23C:
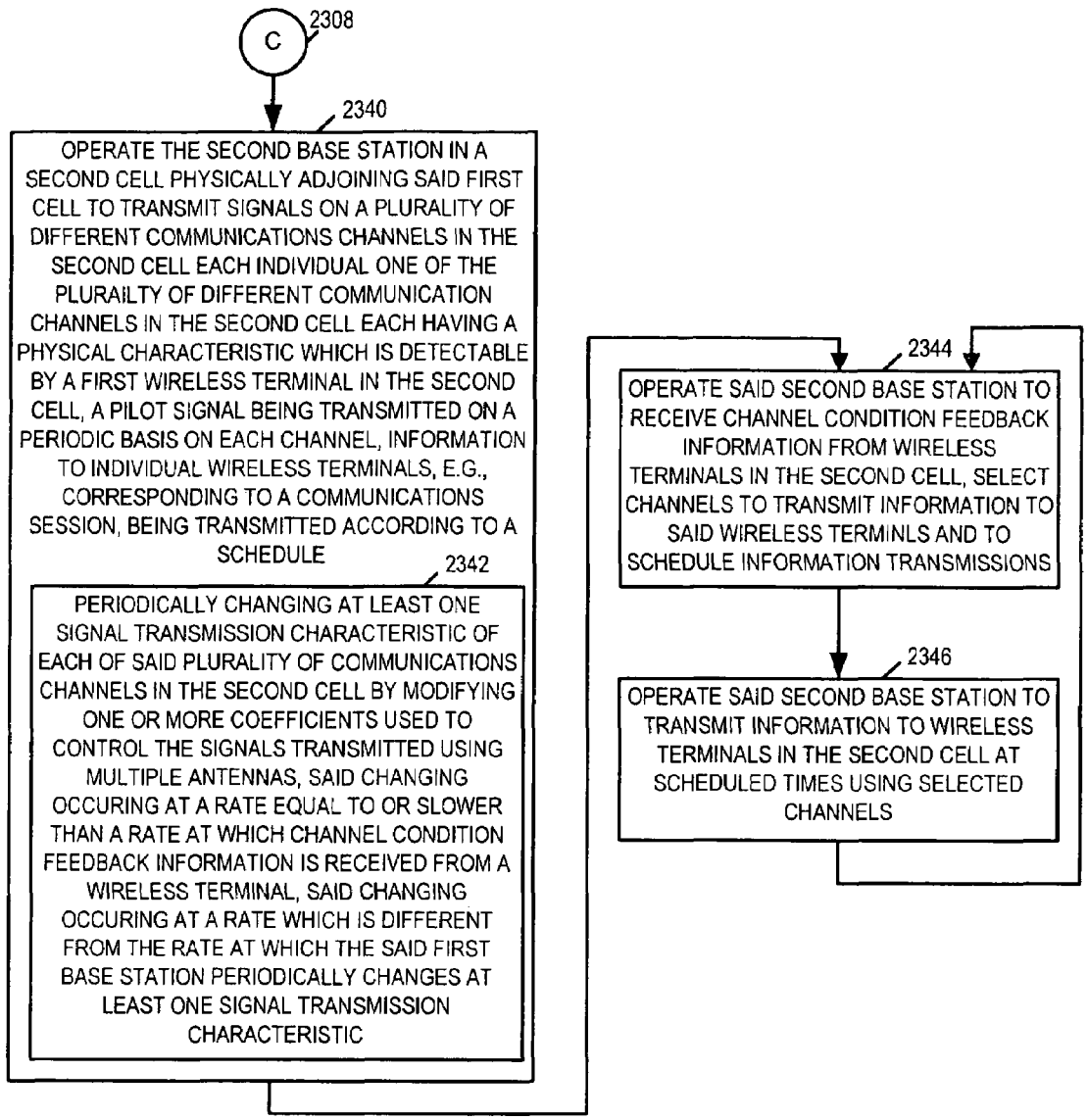

FIG. 23, which comprises the combination of FIGS. 23A, 23B, and 23C, is a flowchart illustrating an exemplary method 2300 of operating a wireless communications system in accordance with the present invention. The method begins with start node 2302, and operation proceeds to step 2304. In step 2304 first and second base stations and wireless terminals, e.g., mobile nodes, are initialized. For the exemplary wireless node, operation proceeds from step 2304 to step 2310. For the exemplary first base station, operation proceeds from step 2304 via connecting node B 2306 to step 2326. For the exemplary second base station, operation proceeds from step 2304 via connecting node C 2308 to step 2340.

In step 2310, the first wireless terminal in a first cell is operated to measure the quality of each of a plurality of different communications channels. Operation proceeds from step 2310 to step 2312. In step 2312, the first wireless terminal is operated to periodically report on measured channel quality on one or more of the different communications channels to the first base station. Operation proceeds to step 2314. In step 2314, the first wireless terminal is operated to maintain a plurality of channel estimates and/or channel quality estimates in parallel for use in processing information signals received from said first base station. Channel estimates are normally based on multiple measurements of the channel to which the particular estimate corresponds, In step 2316, the first wireless terminal is operated to select, based on channel quality measurements, the best one of the different communications channels as perceived by the first wireless terminal. Operation proceeds from step 2316 to step 2318. In step 2318, the first wireless terminal is operated to periodically transmit a feedback signal to the first base station indicating the selected channel to be used to transmit information to the first wireless terminal and information on the quality of the selected channel, e.g., the SNR and/or SIR of the selected channel, the rate of feedback signaling being the same as or faster, e.g., 2×, the rate at which the first base station changes signal transmission characteristics. In step 2320, the first wireless terminal is operated to receive information on the selected channel after the first base station switches from a first channel to a selected channel when transmitting information to the first wireless terminal in response to the feedback information. Operation proceeds from step 2320 to step 2322. In step 2322, the first wireless terminal is operated to switch between a first channel estimate and a channel estimate corresponding to the selected channel in response to receiving information on the selected channel. In step 2324, the first wireless terminal is operated to demodulate the information received on the selected channel by performing a passband to baseband conversion operation.

In step 2326, the first base station in the first cell is operated to transmit signals on a plurality of different communications channels, each individual one of the plurality of different communications channels each having a physical characteristic which is detectable by the first wireless terminal, a pilot signal being transmitted on a periodic basis on each channel, information to individual wireless terminals, e.g., corresponding to a communications session, being transmitted according to a schedule. Step 2326 includes sub-step 2328. In sub-step 2328, the first base station is operated to periodically change at least one signal transmission characteristic of each of said plurality of communications channels by modifying one or more coefficients used to control the signals transmitted using multiple antennas, said changing occurring at a rate equal to or slower than a rate at which channel condition feedback information is received from a wireless terminal. Operation proceeds to step 2330. In step 2330, the first base station is operated to receive feedback information from a plurality of wireless terminals to which said first base station transmits signals, said feedback information including feedback information from the first wireless terminal, said first wireless terminal feedback information including information indicating the quality at said first wireless terminal of one or more channels and in some embodiments a channel selected by said first wireless terminal for transmission of information to said first wireless terminal; said feedback information further including information from a second wireless terminal, said second wireless terminal feedback information including information indicating the quality at said second wireless terminal of one or more channels, and in some embodiments, a channel selected by said second wireless terminal for transmission of information to said second wireless terminal. Operation proceeds from step 2330 to step 2332. In step 2332, the first base station is operated to select between the plurality of communications channels to use to transmit information to the first and second wireless terminals, said first base station selecting the channel for purposes of transmitting to the first wireless terminal a channel identified in received feedback information as having been selected by the first wireless terminal or the channel indicated by the feedback information from the first wireless terminal as having the best transmission characteristics, said selecting resulting in a switching between channels if a selected channel differs from a channel which is currently being used to transmit information to a wireless terminal. Operation proceeds from step 2332 to step 2334. In step 2334, the first base station is operated to schedule information transmissions to individual wireless terminals as a function of the channel selected for transmitting to the individual wireless terminals, said scheduling including giving priority to wireless terminals to use a channel which reported better channel conditions than other wireless terminals selected to use the same channel. Operation proceeds to step 2336; in step 2336 the first base station is operated to transmit information to the wireless terminals at the scheduled times using the selected channels. From step 2336 operation proceeds via connecting node D 2338 to step 2330.

In step 2340, the second base station is operated in a second cell physically adjoining said first cell to transmit signals on a plurality of different communications channels in the second cell each individual one of the plurality of different communications channels in the second cell having a physical characteristic which is detectable by a first wireless terminal in the second cell, a pilot signal being transmitted on a periodic basis on each channel, information to individual wireless terminals, e.g., corresponding to a communications session, being transmitted according to a schedule. Step 2340 includes sub-step 2342. In sub-step 2342, the second base station is operated to periodically change at least one signal transmission characteristic of each of said plurality of communications channels in the second cell by modifying one or more coefficients used to control the signals transmitted using multiple antennas, said changing occurring at a rate equal to or slower than a rate at which channel condition feedback information is received from a wireless terminal, said changing occurring at a rate which is different from the rate at which the said first base station periodically changes at least one signal transmission characteristic. Operation proceeds to step 2344. In step 2344, the second base station is operated to receive channel condition feedback information from wireless terminals in the second cell, select channels to transmit information to said wireless terminals and to schedule information transmissions. Operation proceeds from step 2344 to step 2346. In step 2346, the second base station is operated to transmit information to wireless terminals in the second cell at scheduled times using selected channels. Operation proceeds from step 2346 to step 2344.

A method of the design of beamforming coefficients, in accordance with the invention will now be discussed. A particular design method of time-varying beamforming coefficients, $\underline{g}_m(t)$ will be discussed. (Note: underlining is used to connote a vector.) First the design will be considered for a single pipe case, then it will be extended to multiple pipes.

Intuitively, the beamforming coefficient vector should, over time, "sweep" over a large range of possible channel gains such that $\underline{g}(t)$ will periodically come close to the optimal beamforming configuration for each user. In general, it is advantageous to vary both the phase and magnitude of the coefficients of the K antenna gains thereby producing a multidimensional sweep.

One simple way to sweep over this space is to align $\underline{g}(t)$ to a representative "phantom" user. Specifically, the base station internally generates a random fictitious channel gain vector $\underline{h}(t)=[h_1(t) \ldots h_K(t)]$ according to the distribution function of a typical user in the system. For example, this vector can be generated by having K components, $h_k(t)$, be independent and identically distributed lowpass Gaussian random processes. The gain $\underline{h}(t)$ can be seen as the channel gain of a hypothetical user. The base station then sets the beamforming coefficients $\underline{g}(t)$ to be aligned to this user. That is, $$\underline{g}(t)=\underline{h}(t)/\|\underline{h}(t)\|.$$

As $\underline{h}(t)$ varies in time, the beamforming coefficients $\underline{g}(t)$ will sweep over the set of possible optimal beamforming coefficients. If the probability distribution of channel gain $\underline{h}(t)$ matches the distribution for the users, the beamforming coefficients $\underline{g}(t)$ will have correct distribution to optimally visit each of the possible antenna configurations.

Any lowpass Gaussian random process can be used to generate the components of $\underline{h}(t)$. The bandwidth of the process determines the rate of variation of $\underline{g}(t)$, and thereby provides an adjustable parameter trading off the sweep frequency with the required channel tracking bandwidth at the users.

One simple method of extending a sweeping pattern for a single pipe to multiple pipes is to offset the beamforming coefficients by fixed rotations. Specifically, we first determine the sweeping pattern for some pipe, say pipe 1. Let $\underline{g}_1(t)$ denote the beamforming coefficient for that pipe. $\underline{g}_1(t)$ can be generated using the method discussed above with respect to $\underline{g}(t)$. The beamforming coefficients in the remaining pipes can then be set as some fixed rotation from $\underline{g}_1(t)$. That is, $$\underline{g}_m(t)=U_m\underline{g}_1(t), m=1,\ldots,M, \quad (5)$$

where $U_m$'s are a set of M constant unitary K×K matrices, and where m is the pipe index.

The matrices $U_m$'s should be selected so that, at any time t, the set of coefficients $\underline{g}_m(t)$'s are "maximally" separated, insuring that, for any user at any time, the cannel condition of the best pipe is sufficiently good. To define this criteria more precisely, let $$G(U_1, \ldots, U_M) = E \max_{m=1,\ldots,M} |h'U_m g_1|^2,$$

where the expectation is over h and $g_1$, which we assume to be independent K-dimensional complex Gaussian random vectors. Given a channel gain h, the signal-to-noise ratio (SNR) on pipe m, is proportional to $|h'g_m|^2=|h'U_m g_1|^2$. Therefore, the quantity G represents the expected SNR of the best pipe among the M pipes. One way to select the $U_m$'s is to maximize this quantity, i.e., $$U_1, \ldots, U_M = \underset{U_1 \ldots U_M}{\mathrm{argmax}}\, G(U_1, \ldots, U_M).$$

The maximization problem is essentially equivalent to the problem of finding M vectors uniformly on the K-dimensional sphere. When K=2, the optimal matrices are the rotation matrices, $$U_m = \begin{pmatrix} \cos\theta_m & \sin\theta_m \\ -\sin\theta_m & \cos\theta_m \end{pmatrix}, \quad \theta_m = \frac{(m-1)\pi}{M}$$

For higher dimensional K, procedures for finding good suboptimal matrices are available.

Various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be used with CDMA, orthogonal frequency division multiplexing (OFDM), or various other types of communications techniques which may be used to provide wireless communications links between access nodes such as base stations and wireless terminals such as mobile nodes. Accordingly, in some embodiments base stations establish communications links with mobile nodes using OFDM or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method for use in a communications system including a first cell including a first base station and at least a first wireless terminal, the method comprising:

operating the first base station to transmit signals on a plurality of different communications channels, each individual one of the plurality of different communications channels each having a physical characteristic which is detectable by said first wireless terminal, transmitting the signals on the plurality of different communications channels including periodically changing at least one signal transmission characteristic of a first communications channel in said plurality of communications channels to introduce an intentional variation into said first communications channel which results in a change in said physical characteristic corresponding to the first communications channel; and selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time, wherein said different communications channels consist of different portions of air link resource that is partitioned in at least one of time and frequency dimension.

2. The communications method of claim 1, further comprising:

operating the first base station to periodically transmit a pilot signal in each of said different communications channels, the pilot signal transmission being independent of information signals transmitted to any wireless terminal using the different communications channels.

3. The communications method of claim 1, wherein said feedback information received from said first wireless terminal includes at least one channel quality report.

4. The communications method of claim 3, wherein said at least one channel quality report indicates at least one of a signal to noise ratio and a signal to interference ratio measured at said first wireless terminal for one of said plurality of different communications channels.

5. The communications method of claim 3, wherein the first wireless terminal transmits channel quality reports to said base station for the plurality of different communications channels, the method further comprising:

operating the base station to receive said channel quality reports transmitted by said first wireless terminal; and operating the base station to select between the communications channels for transmitting information to said first wireless terminal as a function of the channel quality reports, the base station selecting the channel indicated to have the best channel quality for transmission to the first wireless terminal.

6. The communications method of claim 3, further comprising:

operating the base station to schedule information transmission to a plurality of wireless terminals on each of the plurality of different communications channels, said scheduling including assigning information transmission times to different wireless terminals which are to use the same one of the different communications channels.

7. The communications method of claim 3, wherein said feedback information is a signal indicating which one of the plurality of different communications channels the first wireless terminal has selected to be used for transmitting information to said first wireless terminal, the method further comprising:

operating the base station to receive a feedback signal from a second wireless terminal indicating which one of the plurality of different communications channels the second wireless terminal selected to be used for transmitting information to said second wireless terminal; and operating the base station to control scheduling of transmissions to said first and second wireless terminals on the same one of said plurality of different communications channels when said received feedback signals indicate that the first and second wireless terminals have selected the same communications channel for the transmission of information from the base station.

8. The method of claim 7, wherein the base station schedules transmission to the first and second wireless terminals on said selected same communications channel as a function of channel quality information provided by said first and second wireless terminals.

9. The method of claim 1, further comprising:

operating the first wireless terminal to make measurements of a plurality of communications channels included in said plurality of different communications channels.

10. The method of claim 9, further comprising:

operating the first wireless terminal to select between said plurality of communications channels based on said measurements and to communicate said selection to said base station.

11. The method of claim 10, further comprising:

operating the wireless terminal to transmit said feedback information, said feedback information indicating said selection to said base station.

12. The method of claim 11, wherein said transmitted feedback information includes at least one channel identifier corresponding to said selected channel or channels, and channel quality information determined from a signal received on said selected channel or channels.

13. The method of claim 1, wherein said plurality of different communications channels includes at least 3 different communications channels, said three different communications channels including said first communications channel, a second communications channel and a third communication channel; and wherein said step of operating the first base station to transmit signals on the plurality of different channels further includes:

changing at least one signal characteristic of each of said second and third communications channels on a periodic basis.

14. The method of claim 13, wherein changing at least one signal characteristic of each of said second and third communications channels includes changing at least one transmission parameter used to control an antenna pattern.

15. The method of claim 14, wherein the changing of the signal characteristics of said first, second and third communications channels is performed in a synchronized manner to maintain a physical difference between each of the first, second and third communications channels.

16. The method of claim 14, wherein the changing of the signal characteristics of said first, second and third communications channels is performed to statistically maximize the maximal signal to noise ratios of the first, second and third signal communications channels.

17. The method of claim 1, wherein said communications system further includes a second cell including a second base station and at least a second wireless terminal, the method comprising operating the second base station to transmit additional signals on a second plurality of different communications channels, each individual one of the second plurality of different communications channels each having a physical characteristic which is detectable by said second wireless terminal, transmitting the additional signals on the second plurality of different communications channels including periodically changing at least one signal transmission characteristic of a second communications channel in said second plurality of communications channels to introduce an intentional variation into said second communications channel which results in a change in said physical characteristic corresponding to the second communications channel, the changing of at least one signal transmission characteristic of the second communications channel being performed at a second rate which is different from a first rate at which the at least one signal transmission characteristic of the first communications channel is changed in the first cell; and selecting between said second plurality of different communications channels for purposes of transmitting the additional signals to said second wireless terminal in response to feedback information received from said second wireless terminal indicating the one of the second plurality of different communications channels which provides the best transmission channel conditions for transmissions to the second wireless terminal at a particular point in time.

18. The method of claim 1,
wherein said first communications channel includes a first amplifier and a first antenna; and
wherein changing at least one signal characteristic of the first communications channels includes changing the amplification provided by said first amplifier to a signal being transmitted on said first communications channel.

19. The method of claim 18, wherein said plurality of different communications channels includes a second communications channel, the second communications channel including a second amplifier and a second antenna; the method further comprising:
periodically changing at least one signal characteristic of the second communications channel by periodically changing the amplification provided by said second amplifier to a signal being transmitted on said second communications channel.

20. The method of claim 18, wherein the amplification provided by the first and second amplifiers is changed by changing a control coefficient used to control the amplification provided by said first and second amplifiers.

21. The method of claim 1,
wherein said first communications channel includes a first phase control module and a first antenna;
wherein changing at least one signal characteristic of the first communications channels includes operating the first phase control module to change the phase of a signal being transmitted on said first communications channel;
wherein said plurality of different communications channels includes a second communications channel, the second communications channel including a second phase control module and a second antenna; the method further comprising:
periodically changing at least one signal characteristic of the second communications channel by periodically operating the second phase control module to change the phase of a signal being transmitted on said second communications channel; and wherein said first and second phase control modules are controlled by coefficients which are changed periodically to cause the first and second phase control modules to make said phase changes.

22. The method of claim 1, wherein said base station includes multiple antennas form which said base station transmits said signals on the plurality of different communications channels,
wherein said plurality of channels includes a second communications channel in addition to said first communications channel, the first channel having a gain in a first direction, the second channel having a second gain in said first direction, the method further comprising:
maintaining a difference in the gain in the first direction between the first and second channels while changing values in a set of control coefficients corresponding to said first communications channel and a set of control coefficients corresponding to said second channel, changing values in the set of control coefficients resulting in a change in the gain of the first and second channels in said first direction.

23. A communications method for use in a communications system including a first cell including a first base station and at least a first wireless terminal, the method comprising:
operating the first base station to transmit signals on a plurality of different communications channels, each individual one of the plurality of different communications channels each having a physical characteristic which is detectable by said first wireless terminal, transmitting the signals on the plurality of different communications channels including periodically changing at least one signal transmission characteristic of a first communications channel in said plurality of communications channels to introduce an intentional variation into said first communications channel which results in a change in said physical characteristic corresponding to the first communications channel; and
selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time, wherein said physical characteristic of one of said different communications channels is different from said physical characteristic of another one of said different communications channels.

24. A communications method for use in a communications system including a first cell including a first base station and at least a first wireless terminal, the method comprising:
operating the first base station to transmit signals on a plurality of different communications channels, each individual one of the plurality of different communications channels each having a physical characteristic which is detectable by said first wireless terminal, transmitting the signals on the plurality of different communications channels including periodically changing at least one signal transmission characteristic of a first communications channel in said plurality of communications channels to introduce an intentional variation into said first communications channel which results in a change in said physical characteristic corresponding to the first communications channel; and
selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time, wherein said step of periodically changing at least one signal transmission characteristic to introduce an intentional variation includes:
    introducing at least one of a periodic phase and periodic amplitude variation into said at least one of the different communications channels, the periodicity of the at least one variation being longer than the periodicity between the channel condition feedback information received from said first wireless terminal.

25. A communications method for use in a communications system including a first cell including a first base station and at least a first wireless terminal, the method comprising:
    operating the first base station to transmit signals on a plurality of different communications channels, each individual one of the plurality of different communications channels each having a physical characteristic which is detectable by said first wireless terminal, transmitting the signals on the plurality of different communications channels including periodically changing at least one signal transmission characteristic of a first communications channel in said plurality of communications channels to introduce an intentional variation into said first communications channel which results in a change in said physical characteristic corresponding to the first communications channel;
    selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time; and
    repeating said selecting step, wherein repeating said selecting step includes switching from a previously selected one of said plurality of different communications channels to another one of said plurality of different communications channels which has a better channel quality to said wireless terminal than said previously selected one of said plurality of different communications channels.

26. A communications method for use in a communications system including a first cell including a first base station and at least a first wireless terminal, the method comprising:
    operating the first base station to transmit signals on a plurality of different communications channels, each individual one of the plurality of different communications channels each having a physical characteristic which is detectable by said first wireless terminal, transmitting the signals on the plurality of different communications channels including periodically changing at least one signal transmission characteristic of a first communications channel in said plurality of communications channels to introduce an intentional variation into said first communications channel which results in a change in said physical characteristic corresponding to the first communications channel; and
    selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time, wherein said selecting between said plurality of different communications channels includes switching, and said switching occurs multiple times during an internet protocol communications session being conducted by said first wireless terminal with another terminal through said first base station without the internet protocol communications session being terminated and without the first wireless terminal changing its location within the first cell.

27. A communications method for use in a communications system including a first cell including a first base station and at least a first wireless terminal, the method comprising:
    operating the first base station to transmit signals on a plurality of different communications channels, each individual one of the plurality of different communications channels each having a physical characteristic which is detectable by said first wireless terminal, transmitting the signals on the plurality of different communications channels including periodically changing at least one signal transmission characteristic of a first communications channel in said plurality of communications channels to introduce an intentional variation into said first communications channel which results in a change in said physical characteristic corresponding to the first communications channel; and
    selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time,
    wherein said selecting between said plurality of different communications channels includes switching, and said switching is performed multiple times while said first wireless terminal remains at a fixed location within said first cell; and
    wherein the same carrier frequency is used to transmit the signals on said plurality of different communications channels, said transmitting signals including mixing baseband signals to passband signals having said carrier frequency prior to transmitting said signals on said plurality of different communications channels.

28. A base station comprising:
    means for transmitting signals on a plurality of different communications channels, each individual one of the plurality of different communications channels each having a physical characteristic which is detectable by a first wireless terminal;
    means for periodically changing at least one signal transmission characteristic of a first communications channel in said plurality of communications channels to introduce an intentional variation into said first communications channel which results in a change in said physical characteristic corresponding to the first communications channel;
    means for selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time; and means for scheduling information transmission to a plurality of wireless terminals on each of the plurality of different communications channels, said scheduling including assigning information transmission times to different wireless terminals which are to use the same one of the different communications channels.

29. The base station of claim 28,
wherein said means for periodically changing at least one signal transmission characteristic, includes a coefficient generator for generating sets of control coefficients used to control transmission characteristics of different communications channels in said plurality of communications channels, said control coefficients controlling the processing of signals to be transmitted on the different communications channels.

30. A communications method for use in a communications system including a first cell including a first base station and at least a first wireless terminal, the method comprising:
operating the first base station to transmit signals on a plurality of different communications channels, wherein said plurality of different communications channels includes at least 3 different communications channels, said three different communications channels including a first communications channel, a second communications channel and a third communications channel, each individual one of the plurality of different communications channels each having a physical characteristic which is detectable by said first wireless terminal;
selecting between said plurality of different communications channels for purposes of transmitting the signals to said first wireless terminal in response to feedback information received from said first wireless terminal indicating the one of the plurality of different communications channels which provides the best transmission channel conditions for transmissions to the first wireless terminal at a particular point in time; and
changing at least one signal characteristic of each of said second and third communications channels on a periodic basis,
wherein changing at least one signal characteristic of each of said second and third communications channels includes changing at least one transmission parameter used to control an antenna pattern,
wherein transmitting signals on each of the plurality of different communications channels includes transmitting different information signals on each of the first, second and third communications channels to different wireless terminals, the different information signals being transmitted at the same time using different signal tones but the same carrier frequency.

31. A method of operating a wireless terminal in a communications system in which a base station transmits information using a plurality of communications channels, each communications channel having at least one different physical characteristic, the at least one different physical characteristic of one of the communications channels being intentionally varied by said base station over time, the method of operating the wireless terminal comprising:
making a channel quality measurements of each of said communications channels;
maintaining channel quality estimates for at least two of said communications channels at the same time;
communicating channel quality feedback information to said base station indicative of which one of said plurality of different communications channels has the best quality for use in transmitting signals to said wireless terminal; and operating the wireless terminal to select which one of said plurality of communications channels should be used to transmit information to said wireless terminal as a function of the channel quality measurements,
wherein said channel quality feedback information includes a channel identifier identifying the selected communications channel,
wherein maintaining channel quality estimates for at least two of said communications channels at the same time includes:
maintaining a first channel quality estimate for a first communications channel on which said wireless terminal reports to have good channel quality in said channel quality feedback information; and
maintaining a second channel quality estimate for a second communications channel said wireless terminal does not report to have good channel quality in said channel quality feedback information.

32. A method of operating a wireless terminal in a communications system in which a base station transmits information using a plurality of communications channels, each communications channel having at least one different physical characteristic, the at least one different physical characteristic of one of the communications channels being intentionally varied by said base station over time, the method of operating the wireless terminal comprising:
making a channel quality measurements of each of said communications channels;
maintaining channel quality estimates for at least two of said communications channels at the same time;
communicating channel quality feedback information to said base station indicative of which one of said plurality of different communications channels has the best quality for use in transmitting signals to said wireless terminal, wherein maintaining channel quality estimates for at least two of said communications channels at the same time includes:
maintaining a first channel estimate for a first communications channel;
maintaining a second channel estimate for a second communications channel which is different from said first communications channel,
the method further comprising:
switching between using the first and second channel estimates in response to the first base station switching between said first and second channels in response to feedback information indicating a change in said first and second channels, said change corresponding to a variation intentionally introduced into said first and second channels by said base station.

33. The method of claim 32, wherein information received from said first and second channels is modulated using the same carrier frequency, the method further comprising:
performing a demodulation operation on the signals received in said first and second communications channels without changing a carrier frequency used in said demodulation process from passband to baseband signal format.

34. A wireless terminal for use in a communications system in which a base station transmits information using a plurality of communications channels, each communications channel having at least one different physical characteristic, the at least one different physical characteristic of one of the communications channels being intentionally varied by said base station over time, the wireless terminal comprising:
means for making a channel quality measurements of each of said communications channels;

memory including channel quality estimates for at least two of said communications channels at the same time;

means for communicating channel quality feedback information to said base station indicative of which one of said plurality of different communications channels has the best quality for use in transmitting signals to said wireless terminal; and means for selecting which one of said plurality of communications channels should be used to transmit information to said wireless terminal as a function of the channel quality measurements; and wherein said channel quality feedback information communicated by said means for communicating includes a channel identifier identifying the selected communications channel.

35. The wireless terminal of claim 34, further comprising:

means for maintaining a first channel estimate for a first communications channel;

means for maintaining a second channel estimate for a second communications channel which is different from said first communications channel; and means for switching between using the first and second channel estimates in response to the first base station switching between said first and second channels in response to feedback information indicating a change in said first and second channels, said change corresponding to a variation intentionally introduced into said first and second channels by said base station.

36. A transmission method for use in a device including multiple antennas, comprising:

processing a first signal as a function of at least one coefficient in a first transmission control coefficient set corresponding to a first channel to produce a first processed signal having a first physical signal characteristic;

transmitting the first processed signal from at least one of said multiple antennas;

transmitting at least one other signal corresponding to the first signal, in parallel with the transmission of said first processed signal, from another one of said multiple antennas;

processing a second signal as a function of at least one coefficient in a second transmission control coefficient set corresponding to a second channel to produce a second processed signal, said second processed signal having a second physical signal characteristic introduced by said processing which is different from said first physical signal characteristic;

transmitting the second processed signal from at least one of said multiple antennas;

transmitting at least one other signal corresponding to the second signal, in parallel with the transmission of said second processed signal, from another one of said multiple antennas;

receiving channel condition feedback information from a wireless terminal at a first rate; and scheduling transmission of signals to said first wireless terminal as a function of said channel condition feedback information.

37. The method of claim 36, further comprising:

modifying at least one coefficient in said first transmission control coefficient set, by an amount sufficient to induce a change in said feedback information, at a rate which is less than or equal to said first rate.

38. The method of claim 37, further comprising:

modifying at least one coefficient in said second transmission control coefficient set, by an amount sufficient to induce a change in said feedback information.

39. The method of claim 38, wherein said modifying at least one coefficient in said first transmission control coefficient set is performed at a rate which is less than or equal said first rate; and wherein said modifying at least one coefficient in said second transmission control coefficient set is performed at a rate which is less than or equal said first rate.

40. The method of claim 36, wherein modifying at least one coefficient in said first transmission coefficient set induces at least one of a phase and a gain variation into signals transmitted using the first channel, the gain variation causing an amplitude variation in the transmitted signal.

41. The method of claim 40, wherein the gain variation introduced into the first channel over a first period of time corresponding to the time between the receipt of channel condition feedback information from said wireless terminal is less than the gain difference between the first and second channels during the first period of time.

42. The method of claim 36, wherein said first and second processed signals are transmitted at the same time.

43. The method of claim 36, wherein said first and second processed signals are transmitted in non-overlapping periods of time which recur on a periodic basis.

44. The method of claim 36, wherein the coefficients in the first set of transmission control coefficients is changed at intervals longer than 35 milli-seconds.

45. The method of claim 36, wherein the coefficients in the first set of transmission control coefficients are changed at a rate which is at least one half the first rate, thereby allowing for the receipt of two channel quality reports from said wireless terminal for each time the first coefficient set is changed.

46. The method of claim 36, wherein at least one of said transmission control coefficients is a complex value.

47. The method of claim 36, wherein at least one of said transmission control coefficients is a value used to control the gain of a signal amplifier.

48. A transmission method for use with a base station including a plurality of antennas which are used to transmit signals to multiple wireless terminals, the method comprising:

maintaining a plurality of channels between said base station and at least one of said wireless terminals, said channels having different transmission characteristics;

maintaining for each channel a transmission control coefficient set including at least one transmission control coefficient used to control at least one of said different transmission characteristics;

receiving channel condition feedback information from at least one wireless terminals at a first rate;

changing, at a second rate, the content of each set of transmission control coefficients over time to induce transmission variations into the signals transmitted using each of the maintained channels, and scheduling transmissions to individual wireless terminals using said channels as a function of received channel condition information.

49. The method of claim 48, wherein said the second rate is less than or equal to the first rate.

50. The method of claim 48, wherein each communications channel has a different channel transfer function, the difference in the channel transfer function resulting in a measurable channel difference at said wireless terminal.

51. The method of claim 48, wherein each channel includes multiple transmit antennas, each transmit antenna transmitting a signal having the same information as signals transmitted from other ones of said multiple transmit antennas corresponding to the same channel but which was subject to different transmission processing prior to transmission as a function of at least one of said transmission control coefficients.

52. The method of claim 48, wherein said different transmission characteristics include at least one of a gain characteristic and a phase characteristic, said different which differs in an amount which can be measured by said wireless terminal from another one of said transmission channels.

53. The method of claim 52, wherein scheduling transmissions includes:
 selecting for a wireless terminal to which a transmission is to be directed, the best one of said plurality of channels on which to transmit the signal being scheduled for transmission.

54. The method of claim 48, wherein said plurality of channels includes a first channel and a second channel, the first channel having a gain in a first direction, the second channel having a second gain in said first direction, the method further comprising:
 maintaining a difference in the gain in the first direction between the first and second channels while changing the sets of control coefficients corresponding to said first and second channels.

55. The method of claim 54, wherein the values of the control coefficients corresponding to the first and second channels are selected to maximize the directional gain difference between said first and second channels.

56. A base station comprising:
 multiple antennas;
 means for processing a first signal as a function of at least one coefficient in a first transmission control coefficient set corresponding to a first channel to produce a first processed signal having a first signal characteristic;
 means for transmitting the first processed signal using at least one of said multiple antennas;
 means for transmitting at least one other signal corresponding to the first signal, in parallel with the transmission of said first processed signal, from another one of said multiple antennas;
 means for processing a second signal as a function of at least one coefficient in a second transmission control coefficient set corresponding to a second channel to produce a second processed signal, said second processed signal having a signal characteristic introduced by said processing which is different from said first signal characteristic;
 means for transmitting the second processed signal from at least one of said multiple antennas;
 means for transmitting at least one other signal corresponding to the second signal, in parallel with the transmission of said first processed signal, from another one of said multiple antennas;
 a receiver for receiving channel condition feedback information from a wireless terminal at a first rate;
 transmission control means for modifying at least one coefficient in said first transmission control coefficient set, by an amount sufficient to induce a change in said feedback information, at a rate which is less than or equal to said first rate; and
 a scheduler for scheduling transmission of signals to wireless terminals as a function of said channel condition feedback information.

57. A base station comprising:
 a processor configured to control said base station to implement a method, the method comprising:
 transmitting signals on a plurality of different communications channels, each individual one of the plurality of different communications channels each having a physical characteristic which is detectable by a wireless terminal;
 periodically changing at least one signal transmission characteristic of a first communications channel in said plurality of communications channels to introduce an intentional variation into said first communications channel which results in a change in said physical characteristic corresponding to the first communications channel; and
 selecting between said plurality of different communications channels for purposes of transmitting the signals to said wireless terminal in response to feedback information received from said first wireless terminal indicating the one of the plurality of different communications channels which provides the best transmission channel conditions for transmissions to the wireless terminal at a particular point in time.

58. The base station of claim 57, wherein the method further comprises:
 scheduling information transmission to a plurality of wireless terminals on each of the plurality of different communications channels, said scheduling including assigning information transmission times to different wireless terminals which are to use the same one of the different communications channels.

59. A computer readable medium embodying machine executable instructions for controlling a base station to implement a method, the method comprising:
 transmitting signals on a plurality of different communications channels, each individual one of the plurality of different communications channels each having a physical characteristic which is detectable by a wireless terminal;
 periodically changing at least one signal transmission characteristic of a first communications channel in said plurality of communications channels to introduce an intentional variation into said first communications channel which results in a change in said physical characteristic corresponding to the first communications channel; and
 selecting between said plurality of different communications channels for purposes of transmitting the signals to said wireless terminal in response to feedback information received from said wireless terminal indicating the one of the plurality of different communications channels which provides the best transmission channel conditions for transmissions to the wireless terminal at a particular point in time.

60. The computer readable medium of claim 59, wherein the method further comprises:
 scheduling information transmission to a plurality of wireless terminals on each of the plurality of different communications channels, said scheduling including assigning information transmission times to different wireless terminals which are to use the same one of the different communications channels.

61. A base station comprising:
 a transmitter module for transmitting signals on a plurality of different communications channels, each individual one of the plurality of different communications channels each having a physical characteristic which is detectable by a wireless terminal;
 a control module for periodically change at least one signal transmission characteristic of a first communications channel in said plurality of communications channels to introduce an intentional variation into said first communications channel which results in a change in said physical characteristic corresponding to the first communications channel; and a selection module for selecting between said plurality of different communications channels for purposes of transmitting the signals to said wireless terminal in response to feedback information received from said wireless terminal indicating the one of the plurality of different communications channels which provides the best transmission channel conditions for transmissions to the wireless terminal at a particular point in time; and a scheduling module for scheduling information transmission to a plurality of wireless terminals on each of the plurality of different communications channels, said scheduling including assigning information transmission times to different wireless terminals which are to use the same one of the different communications channels, wherein said control module for periodically changing at least one signal transmission characteristic, includes a coefficient generator for generating sets of control coefficients used to control transmission characteristics of different communications channels in said plurality of communications channels, said control coefficients controlling the processing of signals to be transmitted on the different communications channels.

* * * * *

UNITED STATES PATENT AND TRADEMARK OFFICE
CERTIFICATE OF CORRECTION

PATENT NO. : 7,630,339 B2  Page 1 of 1
APPLICATION NO. : 10/763944
DATED : December 8, 2009
INVENTOR(S) : Laroia et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1401 days.

Signed and Sealed this

Twenty-first Day of December, 2010

David J. Kappos
*Director of the United States Patent and Trademark Office*